(12) United States Patent
Wada et al.

(10) Patent No.: US 11,290,634 B2
(45) Date of Patent: Mar. 29, 2022

(54) IMAGING APPARATUS, IMAGING METHOD, AND PROGRAM

(71) Applicant: FUJIFILM Corporation, Tokyo (JP)

(72) Inventors: Tetsu Wada, Saitama (JP); Michio Cho, Saitama (JP); Kensuke Masui, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

(21) Appl. No.: 17/026,336

(22) Filed: Sep. 21, 2020

(65) Prior Publication Data
US 2021/0006708 A1 Jan. 7, 2021

Related U.S. Application Data

(63) Continuation of application No. PCT/JP2019/012411, filed on Mar. 25, 2019.

(30) Foreign Application Priority Data

Mar. 30, 2018 (JP) .............................. JP2018-068101

(51) Int. Cl.
H04N 5/232 (2006.01)
G02B 7/34 (2021.01)
(Continued)

(52) U.S. Cl.
CPC .......... H04N 5/23212 (2013.01); G02B 7/34 (2013.01); G02B 7/36 (2013.01); G03B 13/36 (2013.01); G03B 17/14 (2013.01)

(58) Field of Classification Search
CPC ........... H04N 5/23212; H04N 5/23245; H04N 5/232122; H04N 5/232123;
(Continued)

(56) References Cited

U.S. PATENT DOCUMENTS 8,526,806 B2 9/2013 Kikuchi
2005/0244153 A1 11/2005 Kusaka
(Continued)

FOREIGN PATENT DOCUMENTS

JP 2005316032 11/2005
JP 2007286217 11/2007
(Continued)

OTHER PUBLICATIONS

"International Search Report (Form PCT/ISA/210)" of PCT/JP2019/012411, dated Jun. 11, 2019, with English translation thereof, pp. 1-5.
(Continued)

Primary Examiner — Shahbaz Nazrul
(74) Attorney, Agent, or Firm — JCIPRNET

(57) ABSTRACT

Provided are an imaging apparatus, an imaging method, and a program that can directly determine a sensor position at which an image with good image quality is obtained from obtained image information. The imaging apparatus moves an image sensor to a plurality of sensor positions in the optical axis direction of an imaging lens, and focuses a subject at each of the plurality of sensor positions. Image data of the subject focused at each of the plurality of sensor positions is acquired, and the image data is analyzed to calculate an image evaluation value at each of the plurality of sensor positions.

23 Claims, 20 Drawing Sheets

(51) Int. Cl.
  *G02B 7/36* (2021.01)
  *G03B 13/36* (2021.01)
  *G03B 17/14* (2021.01)

(58) Field of Classification Search
  CPC .. H04N 5/36961; H04N 5/23209; G02B 7/34;
      G02B 7/36; G02B 7/38; G03B 13/36;
      G03B 17/14; G03B 3/10
  See application file for complete search history.

(56) References Cited

U.S. PATENT DOCUMENTS

| | | | | |
|---|---|---|---|---|
| 2011/0044677 | A1* | 2/2011 | Oikawa | H04N 5/217 |
| | | | | 396/121 |
| 2016/0173760 | A1* | 6/2016 | Kudo | H04N 5/232122 |
| | | | | 348/353 |
| 2017/0289436 | A1* | 10/2017 | Katsuyama | G02B 7/38 |
| 2018/0007254 | A1* | 1/2018 | Tsuji | H04N 5/232122 |
| 2020/0221016 | A1* | 7/2020 | Wada | H04N 5/2356 |
| 2020/0221017 | A1* | 7/2020 | Wada | G03B 17/14 |
| 2020/0221034 | A1* | 7/2020 | Wada | H04N 9/04557 |
| 2020/0228723 | A1* | 7/2020 | Aoki | H04N 5/2354 |
| 2020/0379317 | A1* | 12/2020 | Aoki | H04N 5/36961 |
| 2020/0404156 | A1* | 12/2020 | Aoki | G03B 13/34 |

FOREIGN PATENT DOCUMENTS

| | | |
|---|---|---|
| JP | 2010169882 | 8/2010 |
| JP | 2012222602 | 11/2012 |
| JP | 2016020982 | 2/2016 |
| JP | 2017182054 | 10/2017 |

OTHER PUBLICATIONS

"International Preliminary Report on Patentability (Form PCT/IPEA/409) of PCT/JP2019/012411", dated Oct. 31, 2019, with English translation thereof, pp. 1-20.

* cited by examiner

IMAGING APPARATUS, IMAGING METHOD, AND PROGRAM

CROSS-REFERENCE TO RELATED APPLICATIONS

The present application is a Continuation of PCT International Application No. PCT/JP2019/012411 filed on Mar. 25, 2019 claiming priority under 35 U.S.C § 119(a) to Japanese Patent Application No. 2018-068101 filed on Mar. 30, 2018. Each of the above applications is hereby expressly incorporated by reference, in its entirety, into the present application.

BACKGROUND OF THE INVENTION

1. Field of the Invention

The present invention relates to an imaging apparatus, an imaging method, and a program.

2. Description of the Related Art

Conventionally, a technique has been known in which a position of an image sensor is moved in the front and back direction of an optical axis of a lens to adjust a position of a flange back or a back focus.

JP2012-222602A discloses a technique of controlling a position of the image sensor in the optical axis direction by using information on the lens side.

SUMMARY OF THE INVENTION

In the technique disclosed in JP2012-222602A, the movement of the image sensor in the optical axis direction is performed on the basis of the information on the mounted lens side. Specifically, according to the technique disclosed in JP2012-222602A, information for correcting spherical aberration is stored in advance in a lens to be mounted, and the position of the image sensor is moved by transmitting the information to a camera main body.

On the other hand, in imaging, there are cases where a value deviates from a value designed in advance due to various factors. The various factors include, for example, a manufacturing error of a camera, an operation error of a driving mechanism of a camera, a deviation from a design value due to a temperature at the time of image capturing, and the like. Accordingly, the information stored in advance on the lens side cannot cover the deviation from these unexpected design values, and a case occurs in which the movement control of the image sensor in the optical axis direction cannot be performed well.

The present invention has been made in view of such circumstances, and an object of the invention is to provide an imaging apparatus, an imaging method, and a program that can directly determine a sensor position at which an image with good image quality is obtained from obtained image data.

The imaging apparatus according to one aspect of the present invention for achieving the above object comprises a focus adjustment unit that moves a focus lens of an imaging lens to perform a focus adjustment; an image sensor that captures an optical image passing through the imaging lens and outputs original image data; an image sensor movement control unit that moves the image sensor to a plurality of sensor positions in an optical axis direction of the imaging lens; a focusing control unit that drives the focus adjustment unit and the image sensor movement control unit to focus a subject at each of the plurality of sensor positions; an imaging control unit that acquires image data of the subject focused at each of the plurality of sensor positions by the focusing control unit on the basis of the original image data output from the image sensor; and an image evaluation unit that analyzes the image data of the subject focused at each of the plurality of sensor positions acquired by the imaging control unit and calculates an image evaluation value at each of the plurality of sensor positions.

According to the present aspect, the focusing control unit drives the focus adjustment unit and the image sensor movement control unit to focus the subject at each of a plurality of sensor positions, and the imaging control unit acquires image data of the subject at each of the plurality of sensor positions. Then, the acquired image data of the plurality of subjects is analyzed to calculate the image evaluation value at each of the plurality of sensor positions. As a result, it is possible to obtain the sensor position at which the image with good image quality can be obtained on the basis of the image evaluation value obtained by directly analyzing the image data.

Preferably, the imaging apparatus comprises an optimum position determination unit that determines an optimum position of the image sensor on the basis of the image evaluation value acquired at each of the plurality of sensor positions, in which the image sensor movement control unit moves the image sensor to the optimum position.

According to the present aspect, the optimum position determination unit determines the optimum position of the image sensor on the basis of the image evaluation values acquired at each of the plurality of sensor positions, and the image sensor movement control unit moves the image sensor to the optimum position. As a result, it is possible to acquire the optimum position which is the sensor position capable of acquiring an image with the highest image quality, and it is possible to move the image sensor to the optimum position.

Preferably, the imaging apparatus comprises a memory that stores the image data; and a storage determination unit that determines the image data to be stored in the memory on the basis of the image evaluation value acquired at each of the plurality of sensor positions.

According to the present aspect, the image data is stored in the memory, and the storage determination unit determines the image data to be stored in the memory on the basis of the image evaluation value acquired at each of the plurality of sensor positions. Thereby, the image data can be efficiently stored in the memory.

Preferably, the focus adjustment unit performs the focus adjustment by an inner focus method or a rear focus method.

According to the present aspect, the focus adjustment unit performs the focus adjustment by the inner focus method or the rear focus method. Here, in the inner focus method or the rear focus method, the influence of the aberration on the position error of the back focus may increase, but in the present aspect, it is possible to obtain a sensor position where the influence of aberration can be reduced even in the inner focus method or the rear focus method.

Preferably, the imaging apparatus comprises a mode setting unit that sets an image evaluation mode for operating the focusing control unit, the imaging control unit, and the image evaluation unit.

According to the present aspect, the mode setting unit sets the image evaluation mode in which the focusing control unit, the imaging control unit, and the image evaluation unit operate. As a result, the image evaluation mode can be set and the image evaluation value can be obtained separately from normal imaging, so that a more accurate operation of the imaging apparatus can be performed.

Preferably, the imaging apparatus comprises a mount on which the imaging lens is mounted, in which the mode setting unit automatically sets the image evaluation mode according to a type of the imaging lens mounted on the mount.

According to the present aspect, in a case where the imaging lens is mounted on the mount, the image evaluation mode is automatically set according to the type of the imaging lens mounted by the mode setting unit. Thereby, the image evaluation value can be efficiently obtained according to the type of the imaging lens.

Preferably, the image evaluation unit calculates the image evaluation value by performing an analysis on at least two positions of a subject position, which is a position of the subject, and a peripheral position in the image data.

According to the present aspect, the image evaluation unit performs the analysis and calculates the image evaluation value in at least two positions of the subject position and the peripheral position in the image data.

Preferably, the peripheral position is determined on the basis of distance information of the subject.

According to the present aspect, since the peripheral position is determined on the basis of the distance information of the subject, it is possible to calculate a highly accurate image evaluation value.

Preferably, the image evaluation unit calculates the image evaluation value on the basis of a contrast of the image data.

According to the present aspect, the image evaluation unit calculates the image evaluation value on the basis of the contrast of the image data. As a result, it is possible to acquire an image evaluation value corresponding to, for example, spherical aberration that affects the contrast of image quality, and it is possible to acquire a sensor position corresponding to the image evaluation value.

Preferably, the image evaluation unit calculates the image evaluation value on the basis of a spatial frequency characteristic acquired from the image data.

According to the present aspect, the image evaluation unit calculates the image evaluation value on the basis of the spatial frequency characteristic acquired from the image data. As a result, it is possible to acquire the image evaluation value that affects the spatial frequency characteristic of the image quality, and it is possible to obtain the sensor position corresponding to the image evaluation value.

Preferably, the image evaluation unit calculates the image evaluation value on the basis of a color shift amount acquired from the image data.

According to the present aspect, the image evaluation unit calculates the image evaluation value on the basis of the color shift amount acquired from the image data. Thereby, the image evaluation value corresponding to the color shift amount can be acquired, and the sensor position corresponding to the image evaluation value can be obtained.

Preferably, the image evaluation unit calculates the image evaluation value on the basis of a shading characteristic acquired from the image data.

According to the present aspect, the image evaluation unit calculates the image evaluation value on the basis of the shading characteristic acquired from the image data. Thereby, the image evaluation value corresponding to the shading characteristic can be acquired, and the sensor position corresponding to the image evaluation value can be obtained.

An imaging apparatus according to another aspect of the present invention comprises a focus adjustment unit that moves a focus lens of an imaging lens to perform a focus adjustment; an image sensor that captures an optical image passing through the imaging lens and outputs original image data; an image sensor movement control unit that moves the image sensor to a plurality of sensor positions in an optical axis direction of the imaging lens; a focusing control unit that drives the image sensor movement control unit to focus a subject at each of the plurality of sensor positions in a case where the focus adjustment unit receives a focus adjustment instruction by a manual focus operation; an imaging control unit that acquires image data of the subject focused at each of the plurality of sensor positions by the focusing control unit on the basis of the original image data output from the image sensor; and an image evaluation unit that analyzes the image data in the focusing state of a plurality of the subjects acquired by the imaging control unit and calculates an image evaluation value at each of the plurality of sensor positions.

According to the present aspect, in a case where the focus adjustment unit receives the focus adjustment instruction by the manual focus operation, the focusing control unit drives the image sensor movement control unit to focus the subject at each of a plurality of sensor positions, and the imaging control unit acquires image data of the subject at each of the plurality of sensor positions. Then, the acquired image data of the plurality of subjects is analyzed to calculate the image evaluation value at each of the plurality of sensor positions. As a result, it is possible to obtain the sensor position at which the image with good image quality can be obtained on the basis of the image evaluation value obtained by directly analyzing the image data.

Preferably, the imaging apparatus comprises an optimum position determination unit that determines an optimum position of the image sensor on the basis of the image evaluation value acquired at each of the plurality of sensor positions, in which the image sensor movement control unit moves the image sensor to the optimum position.

Preferably, the imaging apparatus comprises a memory that stores the image data; and a storage determination unit that determines the image data to be stored in the memory on the basis of the image evaluation value acquired at each of the plurality of sensor positions.

Preferably, the focus adjustment unit performs the focus adjustment by an inner focus method or a rear focus method.

An imaging method according to another aspect of the present invention includes a focus adjustment step of moving a focus lens of an imaging lens to perform a focus adjustment; an image sensor movement control step of moving an image sensor that captures an optical image passing through the imaging lens and outputs original image data to a plurality of sensor positions in an optical axis direction of the imaging lens; a focusing control step of focusing a subject at each of the plurality of sensor positions by activating the focus adjustment step and the image sensor movement control step; an imaging control step of acquiring image data of the subject focused at each of the plurality of sensor positions by the focusing control step on the basis of the original image data output from the image sensor; and an image evaluation step of analyzing the image data of the subject focused at each of the plurality of sensor positions acquired by the imaging control step and calculates an image evaluation value at each of the plurality of sensor positions.

An imaging method according to another aspect of the present invention includes a focus adjustment step of moving a focus lens of an imaging lens to perform a focus adjustment; an image sensor movement control step of moving an image sensor that captures an optical image passing through the imaging lens and outputs original image data to a plurality of sensor positions in an optical axis direction of the imaging lens; a focusing control step of activating the image sensor movement control step to focus a subject at each of the plurality of sensor positions in a case where the focus adjustment step receives a focus adjustment instruction by a manual focus operation; an imaging control step of acquiring image data of the subject focused at each of the plurality of sensor positions by the focusing control step on the basis of the original image data output from the image sensor; and an image evaluation step of analyzing the image data in the focusing state of a plurality of the subjects acquired by the imaging control step and calculates an image evaluation value at each of the plurality of sensor positions.

A program according to another aspect of the present invention causes a computer to execute an imaging process, the imaging process including a focus adjustment step of moving a focus lens of an imaging lens to perform a focus adjustment; an image sensor movement control step of moving an image sensor that captures an optical image passing through the imaging lens and outputs original image data to a plurality of sensor positions in an optical axis direction of the imaging lens; a focusing control step of focusing a subject at each of the plurality of sensor positions by activating the focus adjustment step and the image sensor movement control step; an imaging control step of acquiring image data of the subject focused at each of the plurality of sensor positions by the focusing control step on the basis of the original image data output from the image sensor; and an image evaluation step of analyzing the image data of the subject focused at each of the plurality of sensor positions acquired by the imaging control step and calculates an image evaluation value at each of the plurality of sensor positions.

A program according to another aspect of the present invention causes a computer to execute an imaging process, the imaging process including a focus adjustment step of moving a focus lens of an imaging lens to perform a focus adjustment; an image sensor movement control step of moving an image sensor that captures an optical image passing through the imaging lens and outputs original image data to a plurality of sensor positions in an optical axis direction of the imaging lens; a focusing control step of activating the image sensor movement control step to focus a subject at each of the plurality of sensor positions in a case where the focus adjustment step receives a focus adjustment instruction by a manual focus operation; an imaging control step of acquiring image data of the subject focused at each of the plurality of sensor positions by the focusing control step on the basis of the original image data output from the image sensor; and an image evaluation step of analyzing the image data in the focusing state of a plurality of the subjects acquired by the imaging control step and calculates an image evaluation value at each of the plurality of sensor positions.

According to the present invention, the focusing control unit drives the focus adjustment unit and the image sensor movement control unit to focus the subject at each of a plurality of sensor positions, and the imaging control unit acquires image data of the subject at each of the plurality of sensor positions. Therefore, since the image evaluation values at each of the plurality of sensor positions are calculated by analyzing the acquired image data of the plurality of subjects, it is possible to obtain the sensor position at which the image with good image quality can be obtained on the basis of the image evaluation value obtained by directly analyzing the image data.

DESCRIPTION OF THE PREFERRED EMBODIMENTS

Preferred embodiments of an imaging apparatus, an imaging method, and a program according to the present invention will be described below with reference to the accompanying drawings.

Figure 1:
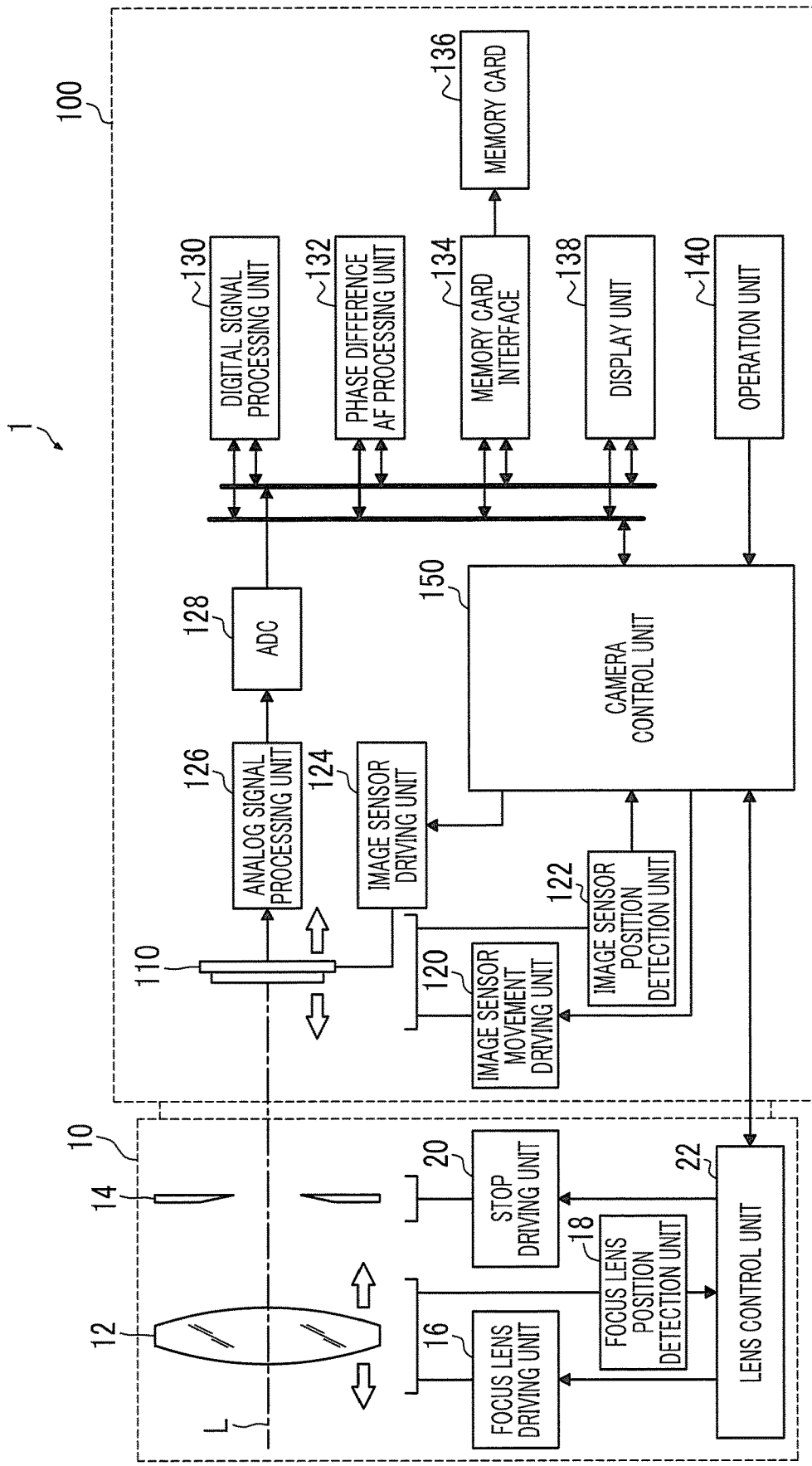
FIG. 1 is a schematic configuration diagram showing an embodiment of a digital camera.

FIG. 1 is a schematic configuration diagram showing an embodiment of a digital camera (imaging apparatus) 1 to which the present invention is applied.

The digital camera 1 shown in the figure is a lens-interchangeable digital camera, and comprises an interchangeable lens (imaging lens) 10 and a camera main body 100. The interchangeable lens 10 is described as being capable of communicating with the camera main body 100 in the following description, but the invention is not limited to this. The interchangeable lens 10 may be one that cannot communicate with the camera main body 100.

The interchangeable lens 10 is an example of an imaging lens. The interchangeable lens 10 is attachably and detachably mounted to the camera main body 100 via a mount 102. The interchangeable lens 10 is configured by combining a plurality of lenses. The interchangeable lens 10 has a focus lens 12 and a stop 14. The focus of the interchangeable lens 10 is adjusted by moving the focus lens 12 back and forth along an optical axis L. In addition, an amount of light is adjusted by adjusting an aperture amount of the stop 14. The interchangeable lens 10 moves the focus lens 12 by an inner focus method or a rear focus method to perform a focus adjustment.

The interchangeable lens 10 comprises a focus lens driving unit 16 that drives the focus lens 12, and a focus lens position detection unit 18 that detects a position of the focus lens 12.

The focus lens driving unit 16 is configured to comprise, for example, an actuator such as a linear motor and a drive circuit thereof, and moves the focus lens 12 back and forth along the optical axis L.

The focus lens position detection unit 18 is composed of, for example, a photo interrupter and a magneto resistive sensor (MR sensor). The photo interrupter detects that the focus lens 12 is located at a predetermined origin position. The MR sensor detects a moving amount of the focus lens 12. The position of the focus lens 12 with respect to the origin position can be detected by detecting that the focus lens 12 is located at the origin position due to the photo interrupter and detecting the moving amount of the focus lens 12 from the origin position due to the MR sensor.

The interchangeable lens 10 comprises a stop driving unit 20 that drives the stop 14. The stop 14 is composed of, for example, an iris stop. The stop driving unit 20 is configured to comprise a motor that drives a stop leaf blade of the iris stop, and a drive circuit for the motor.

The interchangeable lens 10 comprises a lens control unit 22 that controls driving of the focus lens driving unit 16 and the stop driving unit 20. The lens control unit 22 is composed of, for example, a microcomputer, and functions as a focus adjustment unit 22a (FIG. 5), a stop driving control unit, and the like by executing a predetermined control program. The focus adjustment unit 22a controls the driving of the focus lens driving unit 16. The stop driving control controls the driving of the stop driving unit 20. The lens control unit 22 is communicatively connected to the camera control unit 150 of the camera main body 100 via a communication terminal (not shown) comprised on the mount 102.

The camera main body 100 comprises an image sensor 110, an image sensor movement driving unit 120, an image sensor position detection unit 122, an image sensor driving unit 124, an analog signal processing unit 126, an analog to digital converter (ADC) 128, a digital signal processing unit 130, a phase difference AF processing unit 132, a memory card interface 134, a memory card 136, a display unit 138, an operation unit 140, and a camera control unit 150.

The image sensor 110 receives light that has passed through the interchangeable lens 10, captures an optical image of a subject, and outputs original image data. The image sensor 110 is composed of, for example, a solid-state imaging element such as a charged coupled device (CCD) or a complementary metal oxide semiconductor (CMOS). The image sensor 110 has a plurality of phase difference detection pixels 118 on its imaging surface.

Figure 2:
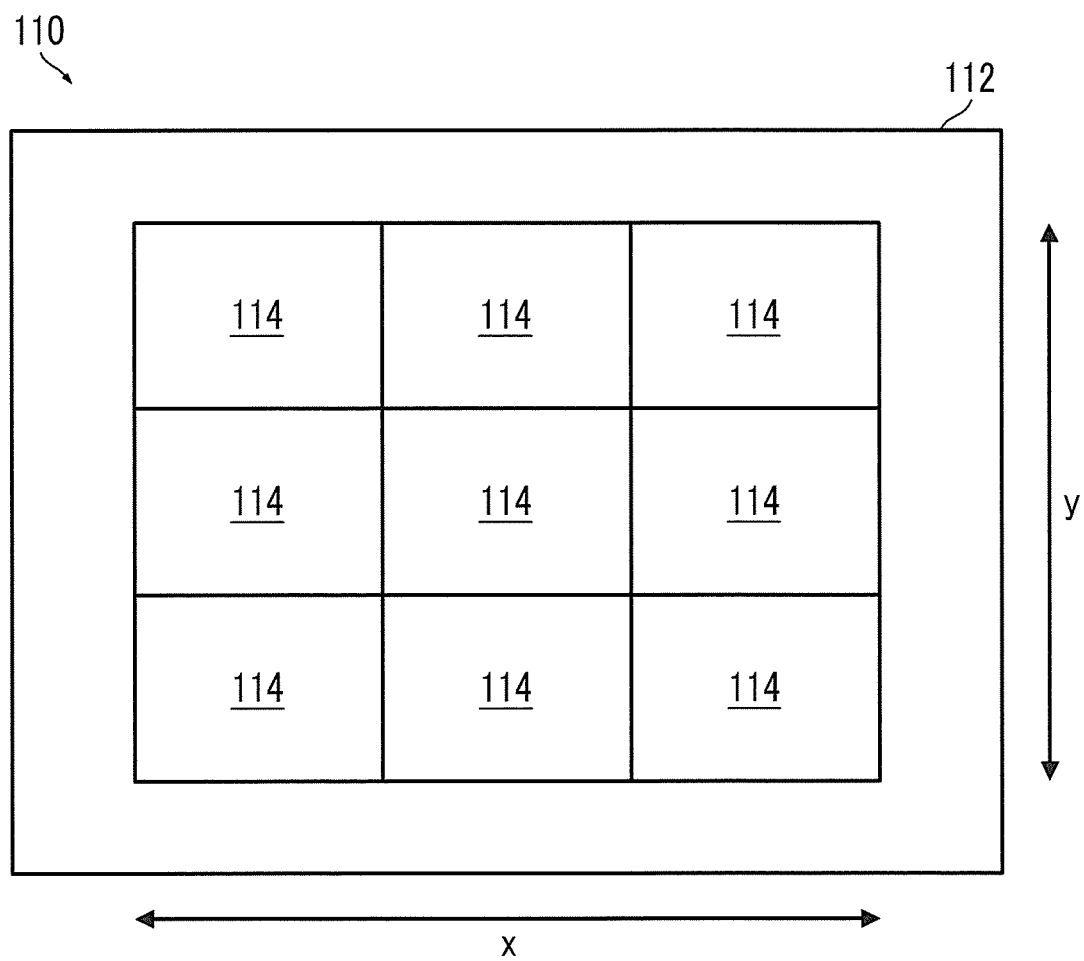
FIG. 2 is a diagram showing a schematic configuration of an image sensor.

FIG. 2 is a diagram showing a schematic configuration of the image sensor 110.

The image sensor 110 has an imaging surface 112 in which a large number of pixels are two-dimensionally arranged in the x direction (row direction) and the y direction (column direction). The imaging surface 112 has a plurality of autofocus (AF) areas 114. The AF area 114 is a region set on the imaging surface 112 as the region in which focusing can be performed. In the example shown in FIG. 2, nine AF areas 114 are set in the central portion of the screen, and upon selection, focusing is performed on a partial AF area 114 or all areas.

Figure 3:
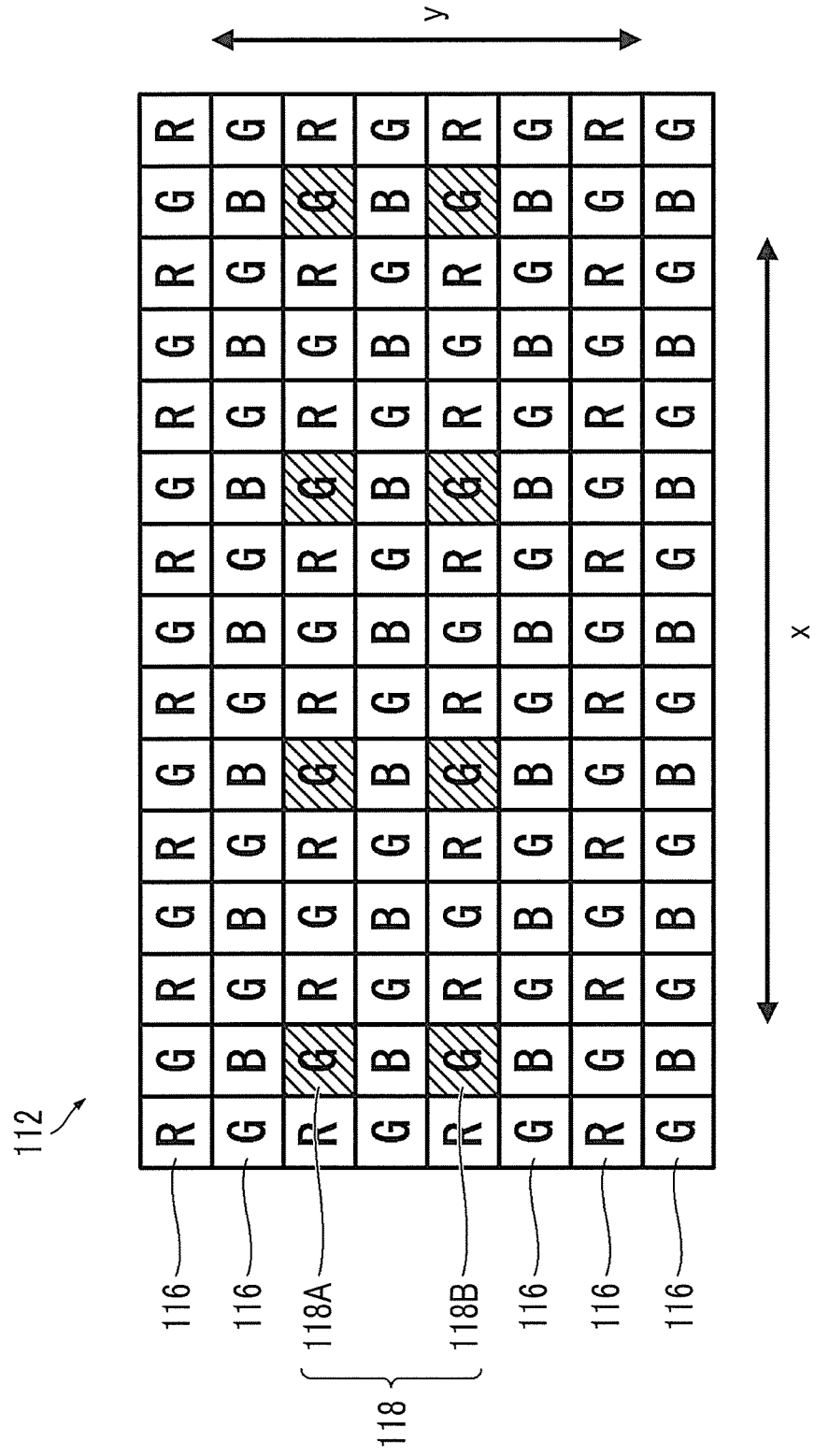
FIG. 3 is an enlarged view of a part of an imaging surface.

FIG. 3 is an enlarged view of a part of the imaging surface.

A large number of pixels are regularly disposed on the imaging surface 112. Each pixel comprises a photoelectric conversion unit and outputs a signal according to a received light amount. In addition, each pixel has a color filter of any one of R (Red), G (Green), and B (Blue). The color filter is assigned to each pixel so as to have a predetermined array. FIG. 3 shows an example of the Bayer array. It should be noted that a pixel (R-pixel) having a color filter of R is denoted by the letter R, a pixel (G-pixel) having a color filter of G is denoted by the letter G, and a pixel (B-pixel) having a color filter of B is denoted by the letter B in FIG. 3.

In the AF area 114, normal pixels 116 and phase difference detection pixels 118 are disposed. The normal pixels 116 are pixels for normal imaging. The phase difference detection pixels 118 are pixels that detect a phase difference. The phase difference detection pixels 118 are an example of a phase difference detection method autofocus sensor. The pixels other than the phase difference detection pixels constitute normal pixels. Only normal pixels are disposed in regions other than the AF area.

In FIG. 3, the phase difference detection pixels 118 are shown by diagonal lines. As shown in FIG. 3, the phase difference detection pixels 118 are regularly disposed on the imaging surface 112.

The phase difference detection pixels 118 are composed of a first phase difference detection pixels 118A and a second phase difference detection pixels 118B. The first phase difference detection pixels 118A and the second phase difference detection pixels 118B are disposed close to each other. The example shown in FIG. 3 shows an example in which the first phase difference detection pixels 118A are disposed at a fixed interval on one of two rows of the same array that are close to each other, and the second phase difference detection pixels 118B are disposed at a fixed interval on the other. In particular, an example is shown in which a specific G pixel in a specific row in which R pixels and G pixels are arranged is used as the phase difference detection pixels 118.

Figure 4:
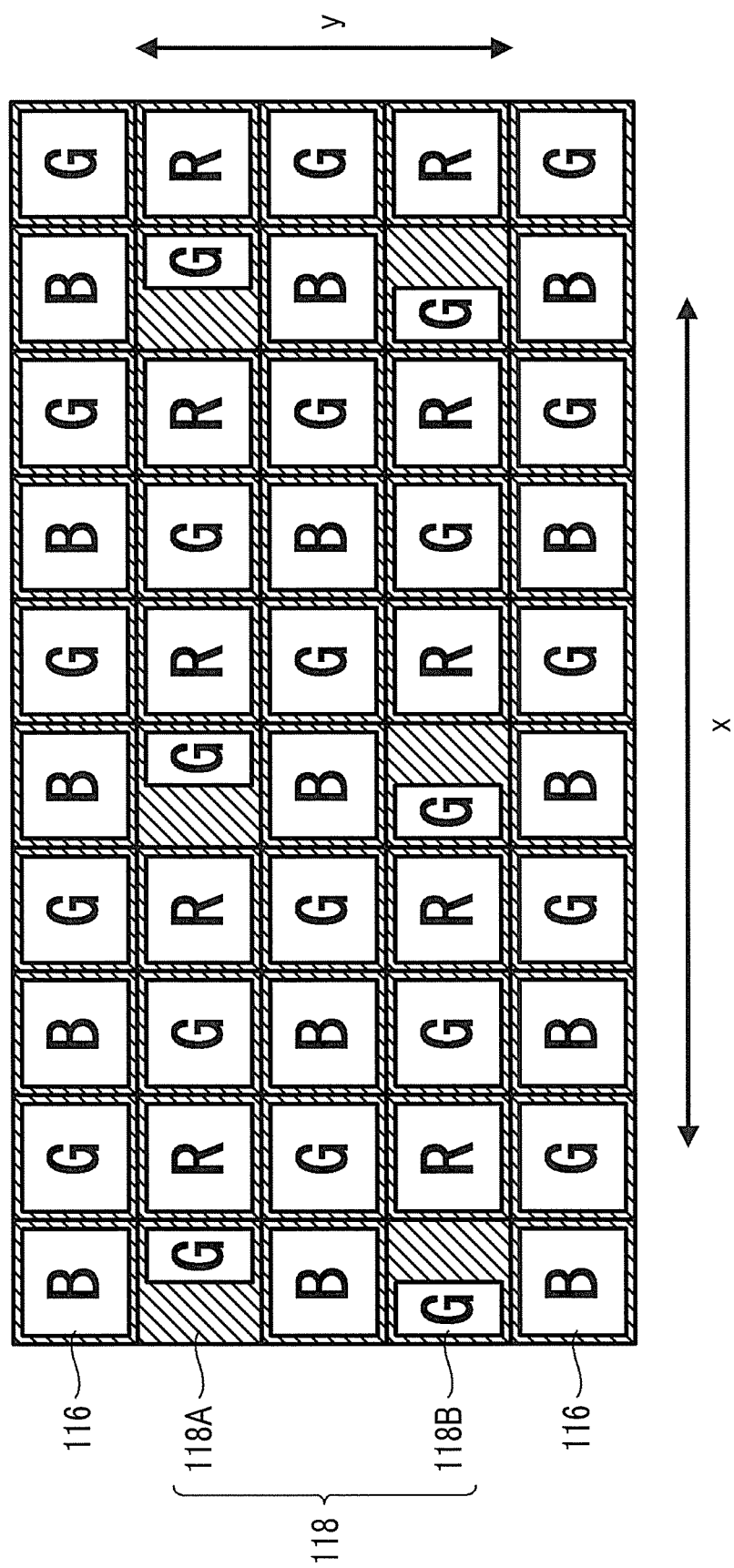
FIG. 4 is a diagram showing a schematic configuration of each pixel.

FIG. 4 is a diagram showing a schematic configuration of each pixel.

Each pixel has a light-shielding film comprising a predetermined aperture part. In FIG. 4, the aperture parts of the light-shielding film comprised in each pixel are shown in white.

The normal pixels 116 have a light-shielding film whose aperture part matches the center of the photoelectric conversion unit. The normal pixels 116 receive a light flux that has passed through almost all of a pupil region of the interchangeable lens 10.

The first phase difference detection pixels 118A have a light-shielding film whose aperture part is eccentric to the right side with respect to the center of the photoelectric conversion unit. As a result, the first phase difference detection pixels 118A receive one of the light fluxes of the pair of light fluxes that have passed through different parts of the pupil region of the interchangeable lens 10.

The second phase difference detection pixels 118B have a light-shielding film whose aperture part is eccentric to the left side with respect to the center of the photoelectric conversion unit. As a result, the second phase difference detection pixels 118B receive the other light fluxes of the pair of light fluxes that have passed through different parts of the pupil region of the interchangeable lens 10.

With the above configuration, the signals of the first phase difference detection pixels 118A and the second phase difference detection pixels 118B are acquired, and both are compared, whereby a phase difference amount can be detected.

The image sensor movement driving unit 120 moves the image sensor 110 back and forth along the optical axis L. The image sensor movement driving unit 120 is configured to comprise, for example, an actuator such as a piezo actuator and a drive circuit thereof.

The image sensor 110 moves within a movable range, and a reference position is set at the center of the movable range. The reference position is set to a flange back position defined by the interchangeable lens 10. Generally, the interchangeable lens 10 is optically designed with the flange back position as a reference. Therefore, the optical performance of the interchangeable lens 10 can be maximized by positioning the image sensor 110 at the reference position.

For example, the flange focal length of the interchangeable lens adopting a C mount is 17.526 mm. In addition, the flange focal length of the interchangeable lens adopting a CS mount is 12.5 mm.

The image sensor position detection unit 122 detects a position of the image sensor 110 (sensor position). The image sensor position detection unit 122 is composed of, for example, a displacement sensor such as an eddy current sensor.

The image sensor driving unit 124 drives the image sensor 110 under the control of the camera control unit 150. The image sensor 110 is driven by the image sensor driving unit 124 to capture an image.

The analog signal processing unit 126 takes in an analog image signal (original image data) for each pixel output from the image sensor 110, and performs predetermined signal processing (for example, correlative double sampling processing, amplification processing, and the like).

The ADC 128 converts the analog image signal output from the analog signal processing unit 126 into a digital image signal and outputs the digital image signal.

The digital signal processing unit 130 takes in the digital image signal and performs predetermined signal processing (for example, gradation conversion processing, white balance correction processing, gamma correction processing, synchronization processing, YC conversion processing, or the like) to generate image data. Here, the image data may be an image itself, or may be data including information (parameters used in various signal processing and intermediate images generated in the process of image generation) at the time of generating the image and the image.

The phase difference autofocus (AF) processing unit 132 acquires the signals of the first phase difference detection pixels 118A and the second phase difference detection pixels 118B from the AF area 114 specified by a user, and calculates the phase difference amount by performing correlation calculation processing on the acquired signals. Then, the direction and amount of defocus are calculated on the basis of the calculated phase difference amount.

The memory card interface 134 reads and writes data with respect to the memory card 136 mounted in a card slot under the control of the camera control unit 150.

The display unit 138 displays various information including images. The display unit 138 is configured to comprise a display device such as a liquid crystal display or an organic electro luminescent (EL) display, and a drive circuit thereof.

A live view is displayed on the display unit 138 in addition to the captured image. The live view is a function of displaying an image captured by the image sensor 110 in real time. By displaying the live view, it is possible to capture the image while checking the image on the display unit 138. In addition, the display unit 138 is also used as a user interface in a case of making various settings.

The operation unit 140 includes general operation means as a digital camera such as a release button, a power switch, an imaging mode dial, a shutter speed dial, an exposure correction dial, a command dial, a menu button, a cross key, a decision button, a cancel button, and an erase button, and outputs a signal corresponding to the operation to the camera control unit 150.

The release button is composed of a so-called two-step stroke type button capable of half-pressing and full-pressing, and an S1ON signal is outputted by half-pressing and an S2ON signal is outputted by full-pressing.

The camera control unit 150 is a control unit that integrally controls the overall operation of the digital camera 1. The camera control unit 150 is composed of, for example, a microcomputer, and provides various functions by executing a predetermined program.

Figure 5:
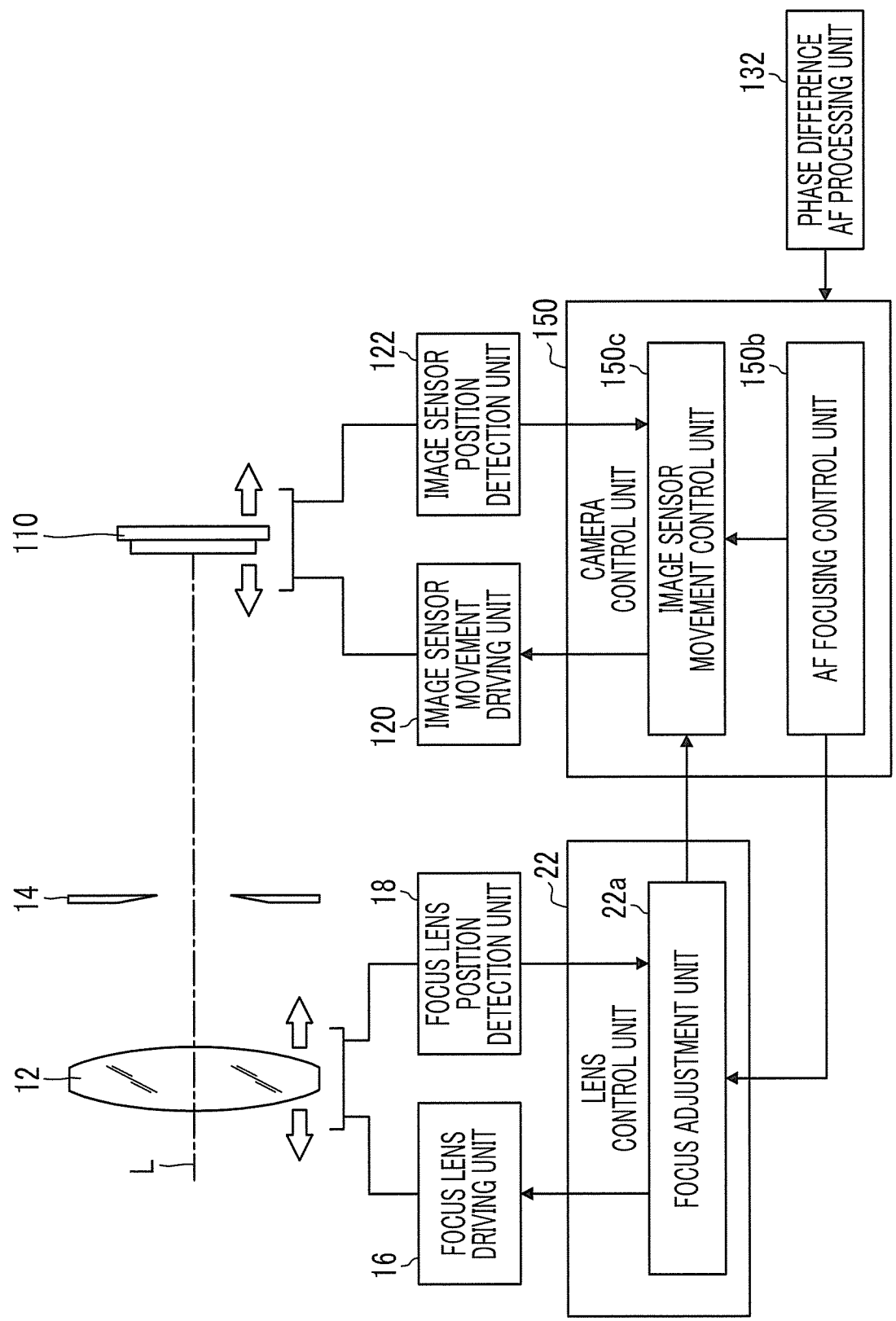
FIG. 5 is a block diagram of functions related to AF.

FIG. 5 is a block diagram of functions related to AF realized by the camera control unit 150 and the lens control unit 22.

As shown in FIG. 5, the camera control unit 150 functions as an autofocus (AF) focusing control unit (focusing control unit) 150*b* and an image sensor movement control unit 150*c* by executing a predetermined program. In addition, the lens control unit 22 also functions as a focus adjustment unit 22*a* by executing a predetermined program.

The AF focusing control unit 150*b* outputs a drive command to the focus adjustment unit 22*a* and the image sensor movement control unit 150*c* on the basis of the phase difference amount obtained from the phase difference AF processing unit 132.

The focus adjustment unit 22*a* moves the focus lens 12 to perform focus adjustment on the basis of the drive command from the AF focusing control unit 150*b*. Specifically, the focus lens driving unit 16 is controlled on the basis of information on a current position of the focus lens 12 detected by the focus lens position detection unit 18, and the focus lens 12 is moved.

The focus adjustment unit 22*a* also outputs the information on the current position of the focus lens 12 detected by the focus lens position detection unit 18 to the image sensor movement control unit 150*c*.

The image sensor movement control unit 150*c* controls the image sensor movement driving unit 120 on the basis of the information on the current position of the focus lens 12 and the information on the current position of the image sensor 110 output from the focus adjustment unit 22*a*, and controls the movement of the image sensor 110. Specifically, the image sensor 110 is moved such that the focus lens 12 focuses, and after focusing, the image sensor 110 is moved so as to follow or tune the movement of the focus lens 12 to maintain the focusing state.

An aspect of movement between the movement of a focal position of the lens and the movement of a sensor position of the image sensor 110 will be described later.

Next, the main functions of the digital signal processing unit 130 will be described.

First Embodiment

Figure 6:
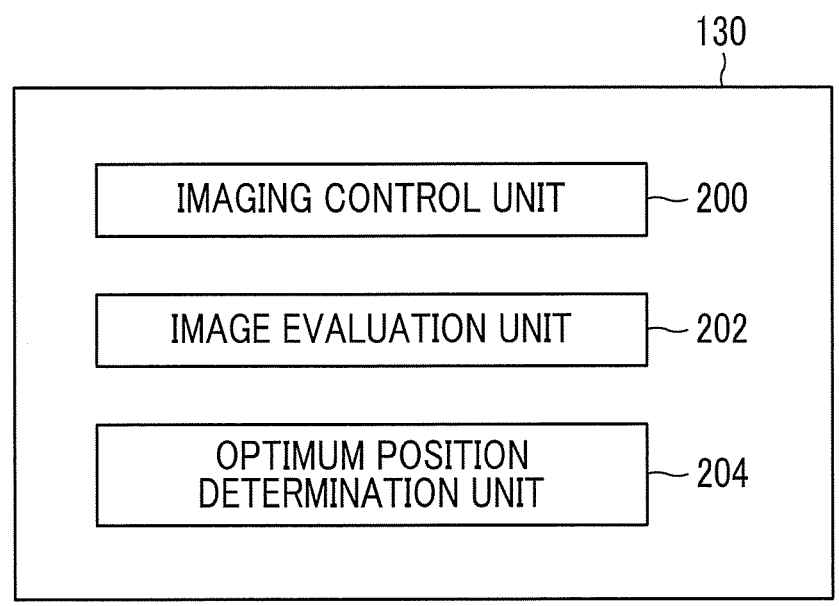
FIG. 6 is a block diagram showing a main functional configuration example of a digital signal processing unit.

FIG. 6 is a block diagram showing a main functional configuration example of the digital signal processing unit 130. The digital signal processing unit 130 is composed of an imaging control unit 200, an image evaluation unit 202, and an optimum position determination unit 204. In the following description, an image will be used as an example of image data. The image data including the image of the focusing state of a subject refers to an image in which a region in the image focused on the subject is shaken. In addition, the image may be an image that is actually captured for recording, or may be an image for a live view image in which an amount of information is smaller than an amount of information for main imaging.

The imaging control unit 200 acquires the image of the subject at each of a plurality of sensor positions on the basis of the original image data from the image sensor 110.

The image evaluation unit 202 analyzes the image of the plurality of subjects acquired by the imaging control unit 200 and calculates an image evaluation value at each of the plurality of sensor positions. The image evaluation unit 202 calculates the image evaluation value that is an index for evaluating the image quality of the image by analyzing the image, and evaluates the image quality of the image. The calculation of the image evaluation value performed by the image evaluation unit 202 will be described in detail later.

The optimum position determination unit 204 determines the optimum position of the image sensor 110 on the basis of the image evaluation value acquired at each of the plurality of sensor positions. Here, the optimum position is a sensor position of the image sensor 110 capable of capturing an image with high image quality. In addition, the high image quality is high image quality in a general sense, and is, for example, an image in which aberration is suppressed or an image in which shading is suppressed. The optimum position determination unit 204 determines a sensor position that gives the best result in the image evaluation value calculated by the image evaluation unit 202 as the optimum position.

<Movement Process to Optimum Position>

Figure 7:
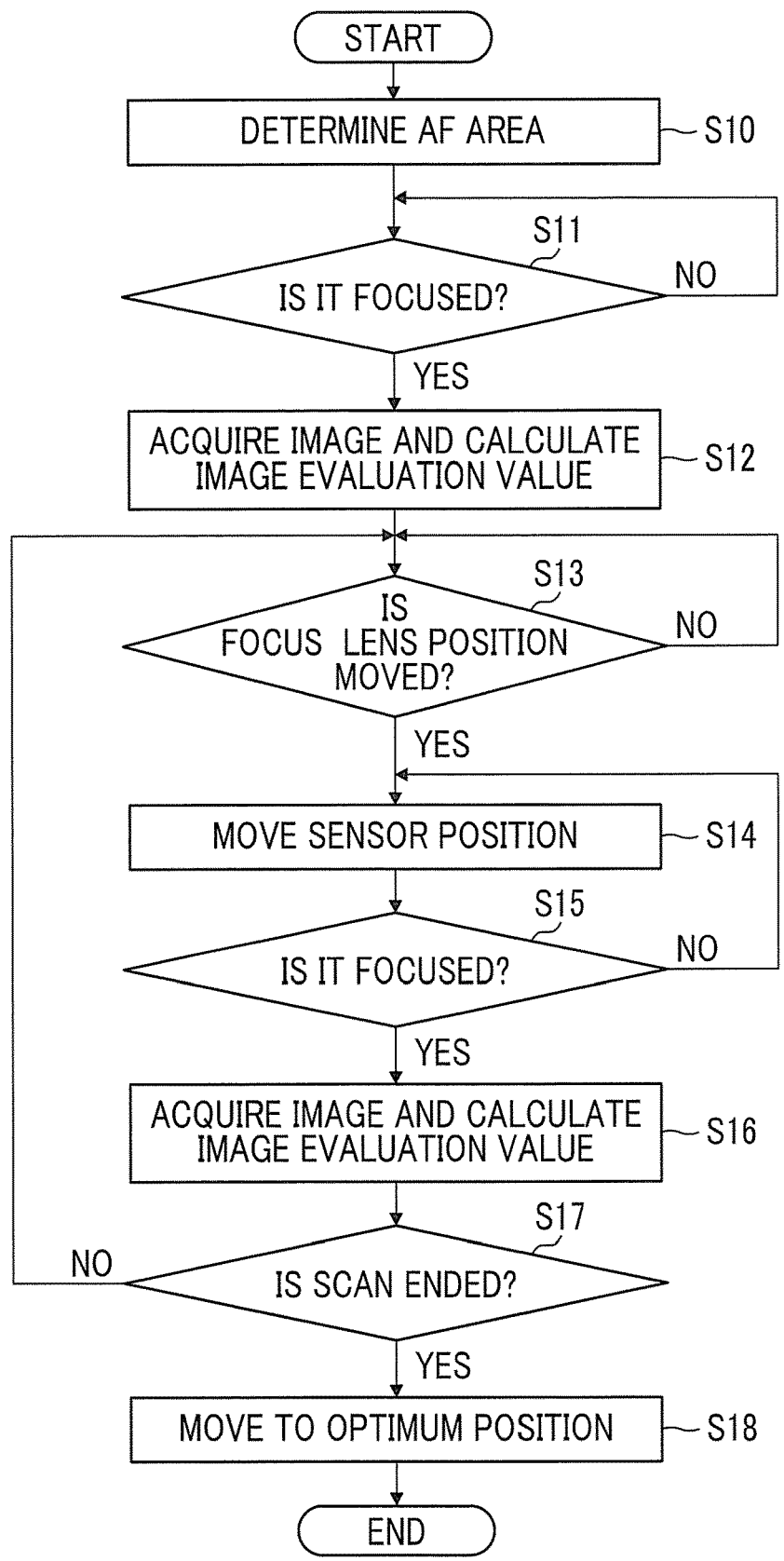
FIG. 7 is a flowchart showing an operation of a digital camera.

Next, an imaging method using the digital camera 1 will be described. FIG. 7 is a flowchart showing an operation of the digital camera 1.

First, the AF area 114 to be finally focused at the start of the AF operation is determined (step S10). Information related to the determined AF area 114 is input to the AF focusing control unit 150b. The AF area 114 may be determined automatically according to a position of a subject in a capturing angle of view, or may be manually set by a user. It should be noted that the determined AF area 114 is fixed and an image evaluation value is acquired by focusing at a plurality of sensor positions as described below.

Next, the shutter button, which is the operation unit 140 of the digital camera 1, is half-pressed, an autofocus function is activated, and the AF focusing control unit 150b focuses (step S11). Specifically, while the position of the image sensor 110 is fixed to an initial position, the focus lens 12 is moved by the focus adjustment unit 22a to focus. Here, the initial position of the image sensor 110 may be the center of a sensor position movable by the image sensor movement driving unit 120, or may be a position determined on the basis of a determination result of the optimum position determination unit 204 in the past photographing. After focusing, the imaging control unit 200 acquires an image (imaging control step), and the image evaluation unit 202 calculates an image evaluation value (step S12: image evaluation step).

Next, the focus lens driving unit 16 is driven by the focus adjustment unit 22a to move a focal position of the interchangeable lens 10, and the AF focusing control unit 150b detects the movement of the focal position of the interchangeable lens 10 (step S13: focus adjustment step). After that, the image sensor movement control unit 150c moves the sensor position of the image sensor 110 (step S14: image sensor movement control step), and the AF focusing control unit 150b focuses (step S15: focusing control step). After focusing, the imaging control unit 200 acquires the image (imaging control step), and the image evaluation unit 202 calculates the image evaluation value (step S16: image evaluation step). After that, the image evaluation unit 202 determines whether or not scan processing has been ended (step S17), and in a case where the scan processing has not been ended, the scan processing is continued. It should be noted that the scan processing here means processes from step S13 to step S17, and means that the image evaluation value is calculated at each sensor position. In a case where the scan processing ends, the optimum position determination unit 204 determines the optimum position, and the image sensor 110 is moved to the optimum position by the image sensor movement control unit 150c (step S18). In the above description, an example in which the focal position of the interchangeable lens 10 is moved first, and then the image sensor 110 is moved to focus is explained. However, the image sensor 110 may be moved first, and then the focal position of the interchangeable lens 10 may be moved to focus.

<Movement of Sensor Position of Image Sensor and Focal Position of Interchangeable Lens>

Next, the movement of the sensor position of the image sensor 110 and the focal position of the interchangeable lens 10 will be described.

<<Auto Focus by Phase Difference Detection Method>>

Figure 8:
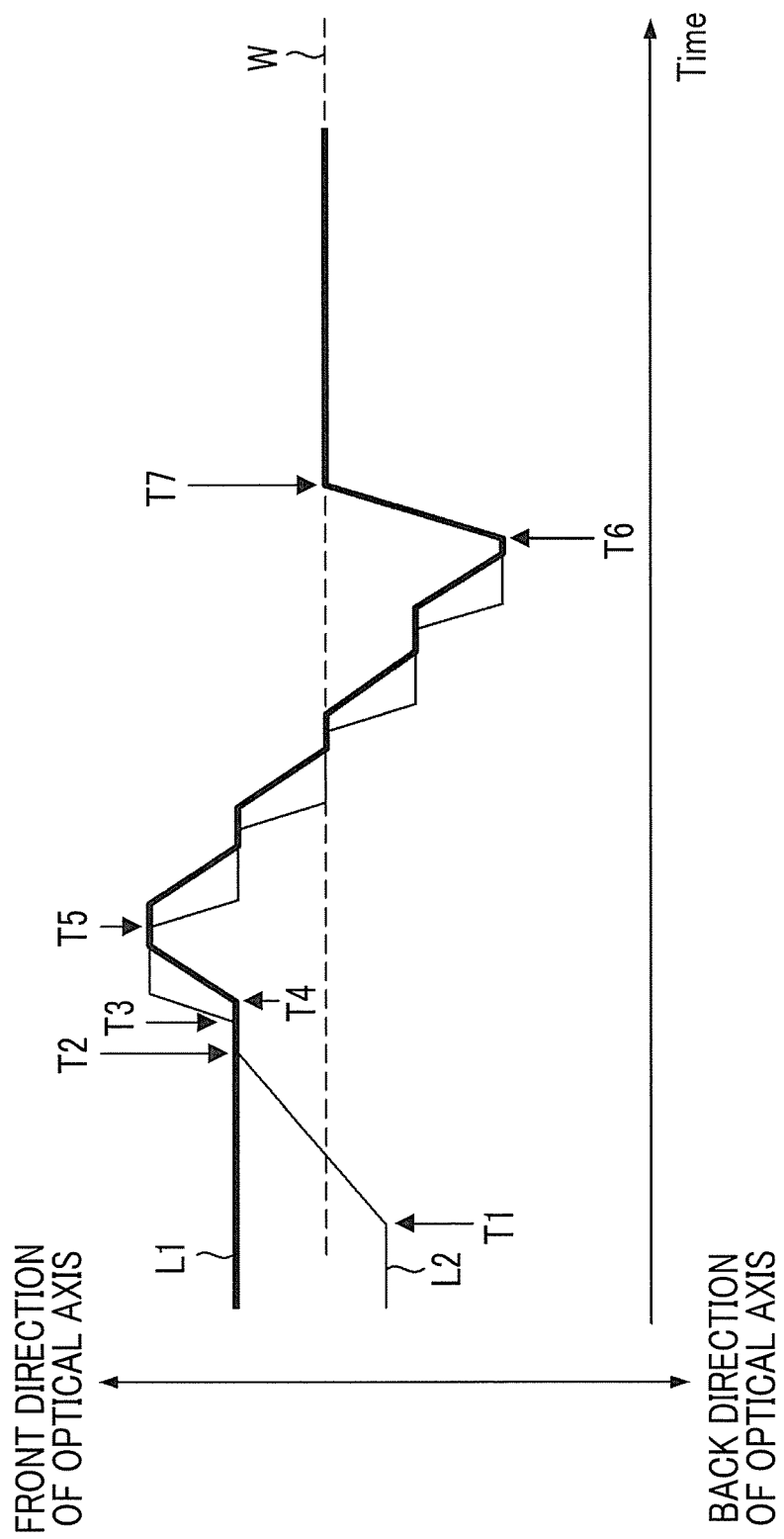
FIG. 8 is a diagram showing movement of an image sensor and a focal position of an interchangeable lens.

FIG. 8 is a diagram showing movement of the image sensor 110 and a focal position of the interchangeable lens 10. It should be noted that the case shown in FIG. 8 is a case where the autofocus function for focusing by using the phase difference detection pixels 118 is used.

In FIG. 8, the vertical axis shows the front and back in the optical axis direction, and the lateral axis shows time. The sensor position is shown by a thick line L1, and the focal position of the interchangeable lens 10 is shown by a thin line L2.

The autofocus starts at time T1 by pressing the shutter button halfway. After that, the focal position of the interchangeable lens 10 is moved by the focus adjustment unit 22a. Then, at time T2, the sensor position and the focal position of the interchangeable lens 10 are in focus (in the figure, the thick line L1 and the thin line L2 overlap each other to indicate the focus) (corresponding to step S11 in FIG. 7). Here, the image is acquired in the focusing state and the image evaluation value is calculated (corresponding to step S12 in FIG. 7). After that, at time T3, the focus lens driving unit 16 is driven to move the focal position of the interchangeable lens 10 (corresponding to step S13 in FIG. 7), and then the sensor position of the image sensor 110 is moved by the image sensor movement control unit 150c (corresponding to step S14 in FIG. 7). At time T5, focusing is performed at a sensor position different from that at time T2 (corresponding to step S15 in FIG. 7), and in the focusing state, the image is acquired and the image evaluation value is calculated (corresponding to step S16 in FIG. 7).

After that, scanning is performed until time T6, and at time T7, the focal position of the interchangeable lens 10 and the sensor position of the image sensor 110 move to an optimum position W (corresponding to step S18 in FIG. 7).

<<Auto Focus by Contrast Method>>

Figure 9:
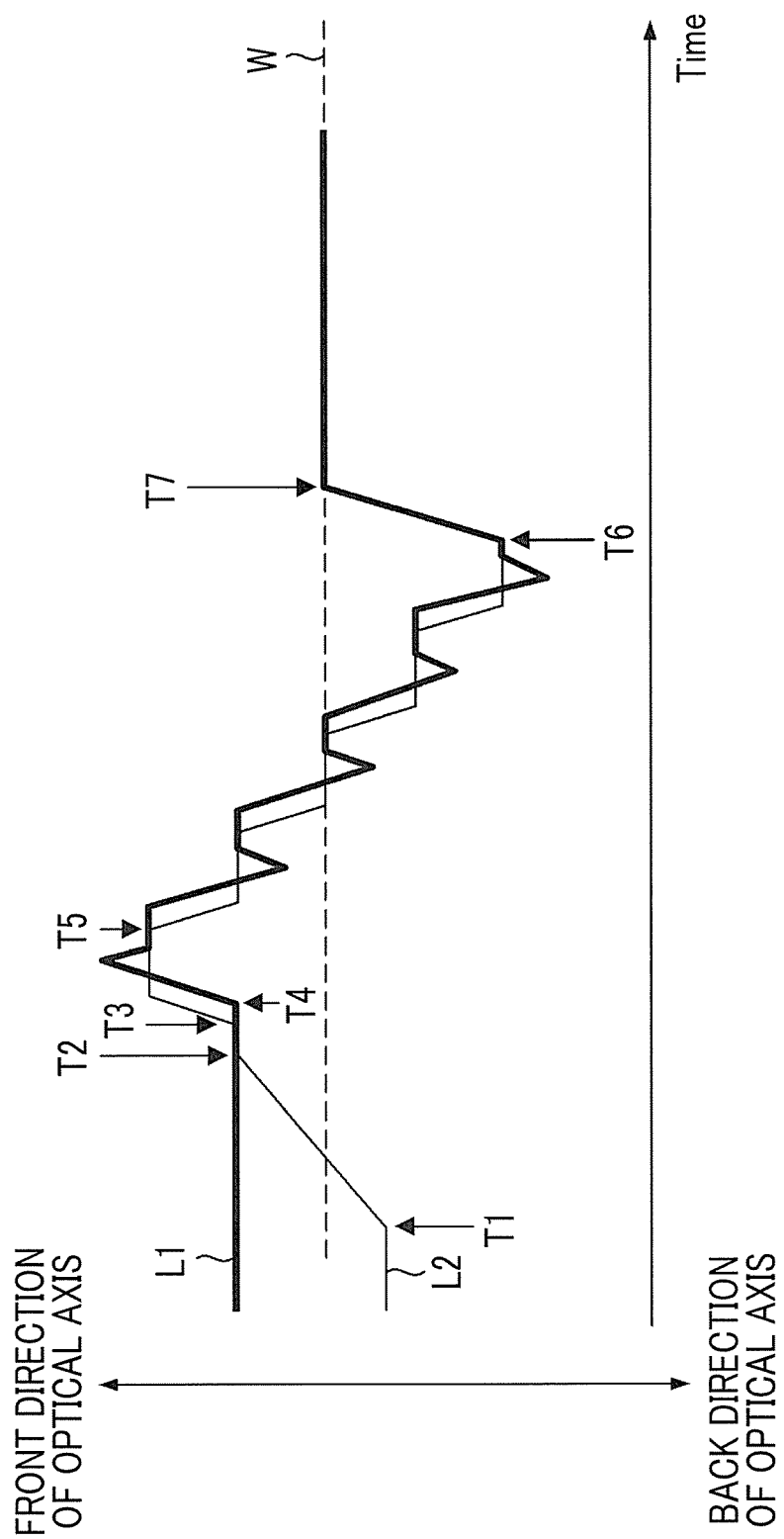
FIG. 9 is a diagram showing movement of an image sensor and a focal position of an interchangeable lens.

FIG. 9 is a diagram similar to FIG. 8, and shows a case where the autofocus function by the contrast method is used.

The autofocus starts at time T1. After that, the focal position of the interchangeable lens 10 is moved by the focus adjustment unit 22a. Then, at time T2, the sensor position and the focal position of the interchangeable lens 10 are in focus (corresponding to step S11 in FIG. 7). Here, the image is acquired in the focusing state and the image evaluation value is calculated (corresponding to step S12 in FIG. 7). After that, at time T3, the focus lens driving unit 16 is driven to move the focal position of the interchangeable lens 10 (corresponding to step S13 in FIG. 7), and then the sensor position of the image sensor 110 is moved by the image sensor movement control unit 150c (corresponding to step S14 in FIG. 7). Here, the image sensor 110 detects a focus by the contrast method. At time T5, focusing is performed at a sensor position different from that at time T2 (corresponding to step S15 in FIG. 7), and in the focusing state, the image is acquired and the image evaluation value is calculated (corresponding to step S16 in FIG. 7).

<<Modification Example 1: Case Where the Focal Position of the Interchangeable Lens and the Image Sensor Follow>>

Figure 10:
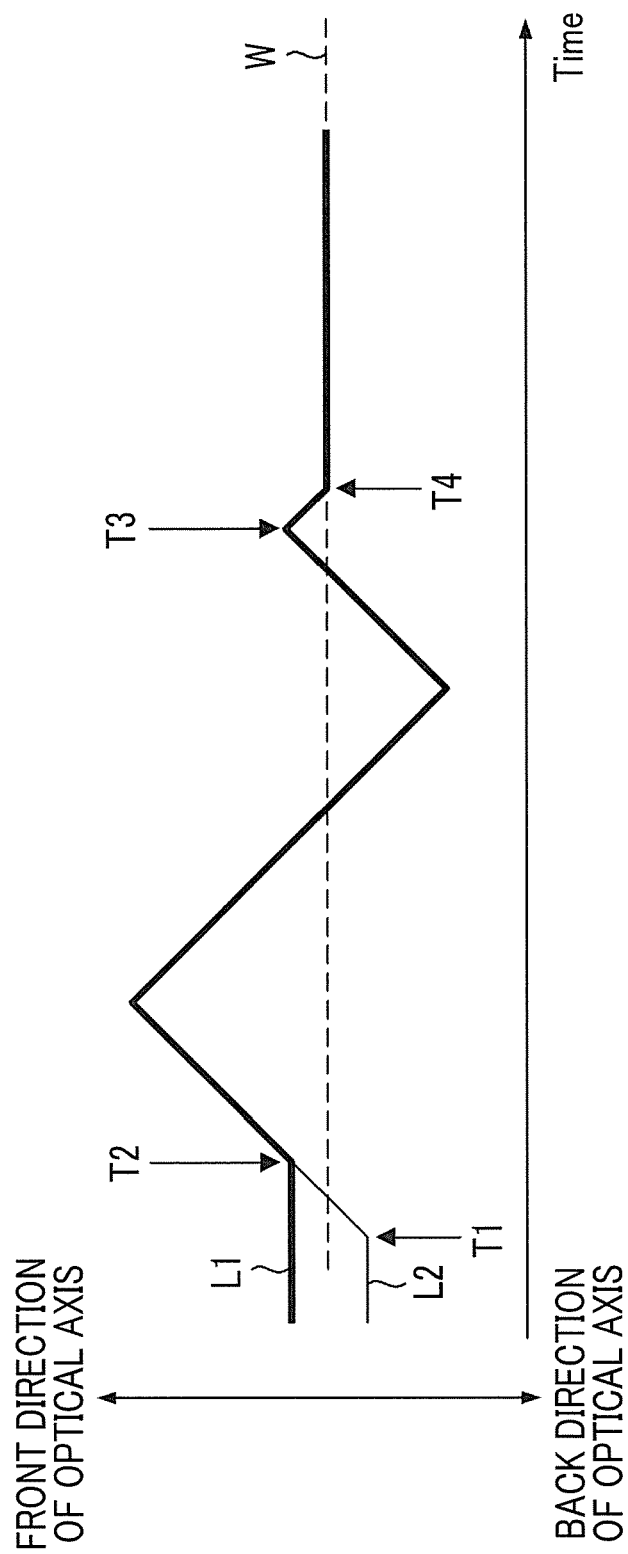
FIG. 10 is a diagram showing movement of an image sensor and a focal position of an interchangeable lens.

FIG. 10 shows an example in which the focal position of the interchangeable lens 10 and the image sensor 110 operate so as to follow each other. In order to operate the focal position of the interchangeable lens 10 and the image sensor 110 as described above, a moving amount of a sensor position in a case where the focal position of the interchangeable lens 10 is moved is set on the camera side in advance (it is necessary to calculate the position of the sensor by the change of the focal position due to the movement of the focus lens 12).

The autofocus starts at time T1. The focal position of the interchangeable lens 10 is moved by the focus adjustment unit 22a. After that, at time T2, the sensor position and the focal position of the interchangeable lens 10 are in focus, and are moved to the front of the optical axis while maintaining the focused state. Then, in a case of moving while focusing, the image sensor 110 outputs an image at each sensor position. It should be noted that the sensor position may be a continuous position or a discrete position.

The image sensor 110 moves and outputs an image while maintaining the focus in the front and back direction of the preset optical axis. At time T3, the movement of the preset distance ends. After that, at time T4, the optimum position W is determined on the basis of the image evaluation value of the image output from the image sensor 110, and the focus of the interchangeable lens 10 and the image sensor 110 move to the optimum position W and are in focus. In a case where the autofocus function is used, for example, the focus lens 12 and the image sensor 110 move in this way, and the optimum position is determined.

<Image Evaluation Value>

Next, the calculation of the image evaluation value performed by the image evaluation unit 202 will be described. The image evaluation unit 202 calculates an image evaluation value that is an evaluation value related to the image quality of the image acquired at each sensor position. The image evaluation value is, for example, a value corresponding to an amount of blurriness in the image or a degree of occurrence of shading in the image. For example, the amount of blurriness used for the image evaluation value is generated according to each aberration described below.

<<Aberration>>

The image evaluation unit 202 calculates an image evaluation value related to aberration of the image. Here, the aberration includes chromatic aberration (axial chromatic aberration, lateral chromatic aberration) and monochromatic aberration (Seidel's 5 aberrations).

As a specific example, a case where the image evaluation unit 202 calculates an image evaluation value related to spherical aberration will be described.

Normally, in the digital camera 1, the spherical aberration is corrected according to the distance assumed in the design. Therefore, in a case where a correlation among the position of the focus lens 12, the focal position of the interchangeable lens 10, and the sensor position of the image sensor 110 is different from a design value, the spherical aberration correction does not function well and an image is blurred.

Figure 11:
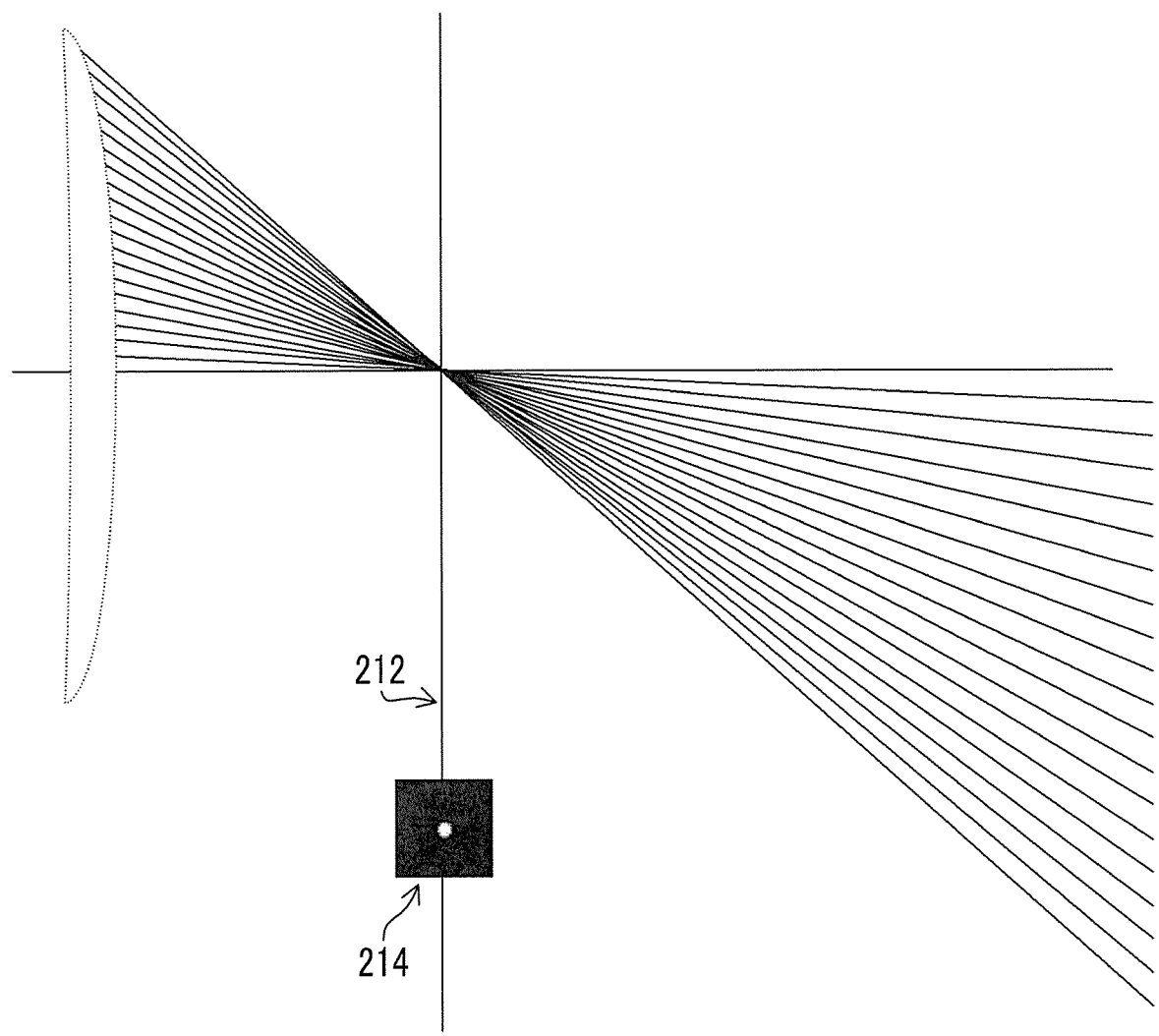
FIG. 11 is a diagram for explaining spherical aberration.
Figure 12:
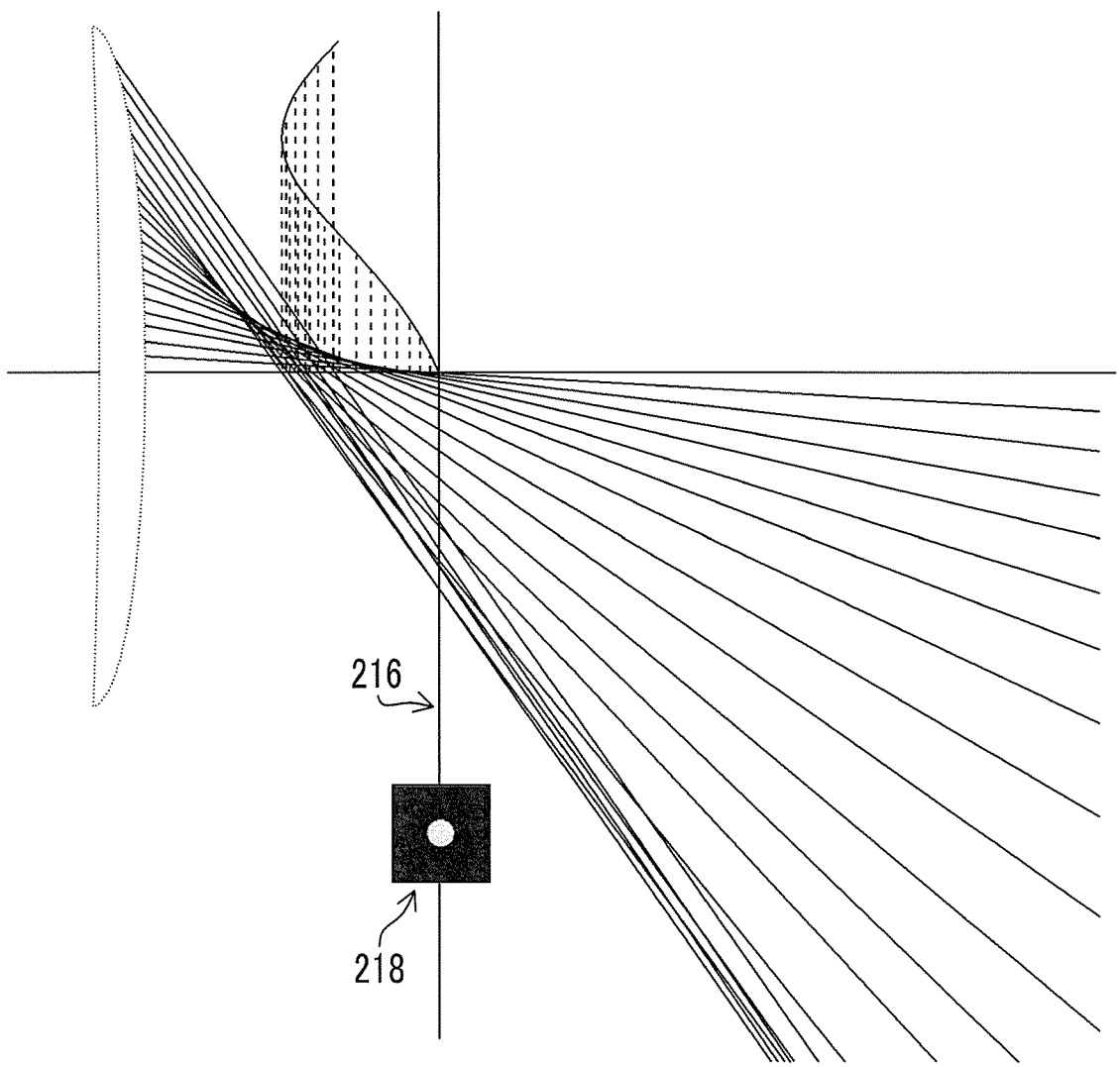
FIG. 12 is a diagram for explaining spherical aberration.

FIGS. 11 and 12 are diagrams explaining spherical aberration in images acquired at different sensor positions. FIG. 11 shows a case where a back focus is not deviated from the design value and the spherical aberration is ideally suppressed. FIG. 12 shows a case where the back focus is deviated from the design value and the spherical aberration is not suppressed.

In FIG. 11, an image 214 is acquired at a sensor position 212. The sensor position 212 is a design value, and in a case where the image sensor 110 is at the sensor position 212, the image 214 in which the spherical aberration is suppressed can be acquired. The image 214 is an image having high contrast and a high sharpness of a subject image.

On the other hand, in FIG. 12, an image 218 is acquired at the sensor position 216 different from the sensor position 212 that is the design value. In a case where the image sensor 110 is at the sensor position 216, an image in which blurriness is not suppressed is acquired since the spherical aberration is not suppressed. The image 218 is an image having low contrast and a low sharpness of a subject image.

In a case of calculating the image evaluation value related to the spherical aberration, the image evaluation unit 202 calculates, for example, an index indicating the contrast of the image as the image evaluation value. For example, the image evaluation unit 202 calculates a sharpness on the basis of the spatial frequency characteristic acquired from the image, and sets the sharpness as the image evaluation value.

As a next specific example, a case where the image evaluation unit 202 calculates an image evaluation value related to chromatic aberration will be described.

The image evaluation unit 202 calculates the image evaluation value on the basis of a color shift amount acquired from the image.

Here, the color shift amount is a random index representing a color shift by horizontal chromatic aberration (lateral chromatic aberration) and longitudinal chromatic aberration (axial chromatic aberration) due to the optical system, and can be expressed by data or the like directly or indirectly indicating a positional shift of an image occurring between different colors.

The image evaluation value related to the lateral chromatic aberration can be calculated, for example, as follows. A local window is set around an edge part in the image to acquire a G array (a pixel value of a pixel having a G filter) in the window and acquire an R array (a pixel value of a pixel having a R filter) at a position where the window is displaced. Next, after adjusting each signal level of the R array such that an average value of a signal level in the R array matches an average value of a signal level in the G array, the sum of an absolute value of a difference between the unit elements of the G array and the R array is acquired as an overlay error. Then, while changing a displacement width of the R array with respect to the G array, the displacement width at which the overlay error becomes minimum is defined as a color shift width between RG, and the color shift width is divided by an image height to calculate a magnification difference between RG (detection).

The image evaluation value related to the axial chromatic aberration can be calculated, for example, as follows. Since an axial chromatic aberration amount changes in a case where the focus state changes, the color shift amount by the lateral chromatic aberration of the R pixel and G pixel looks different. By comparing the color shift amount between images acquired at a plurality of sensor positions, it is possible to evaluate the influence of chromatic aberration including the axial chromatic aberration amount and the lateral chromatic aberration.

<<Shading>>

The image evaluation unit 202 also calculates an image evaluation value related to a shading characteristic of an image. Here, the shading characteristic is a random index representing a shading due to the optical system, and refers to a characteristic capable of being expressed by data or the like directly or indirectly indicating light attenuation distribution (luminance unevenness) by the shading.

Figure 13:
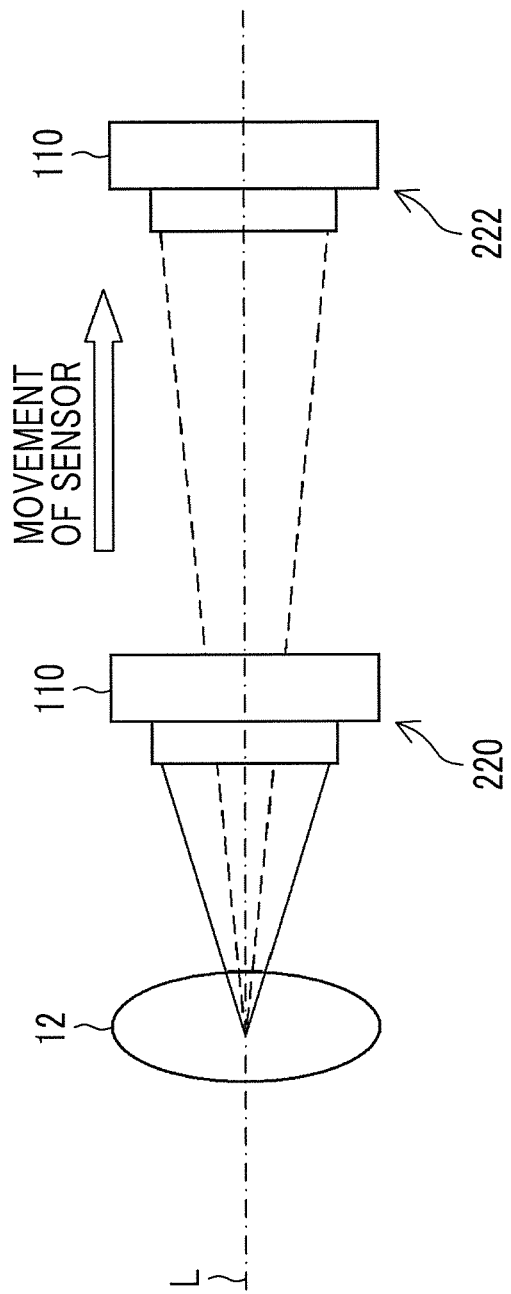
FIG. 13 is a diagram for explaining that a shading characteristic is changed by moving an image sensor.
Figure 14:
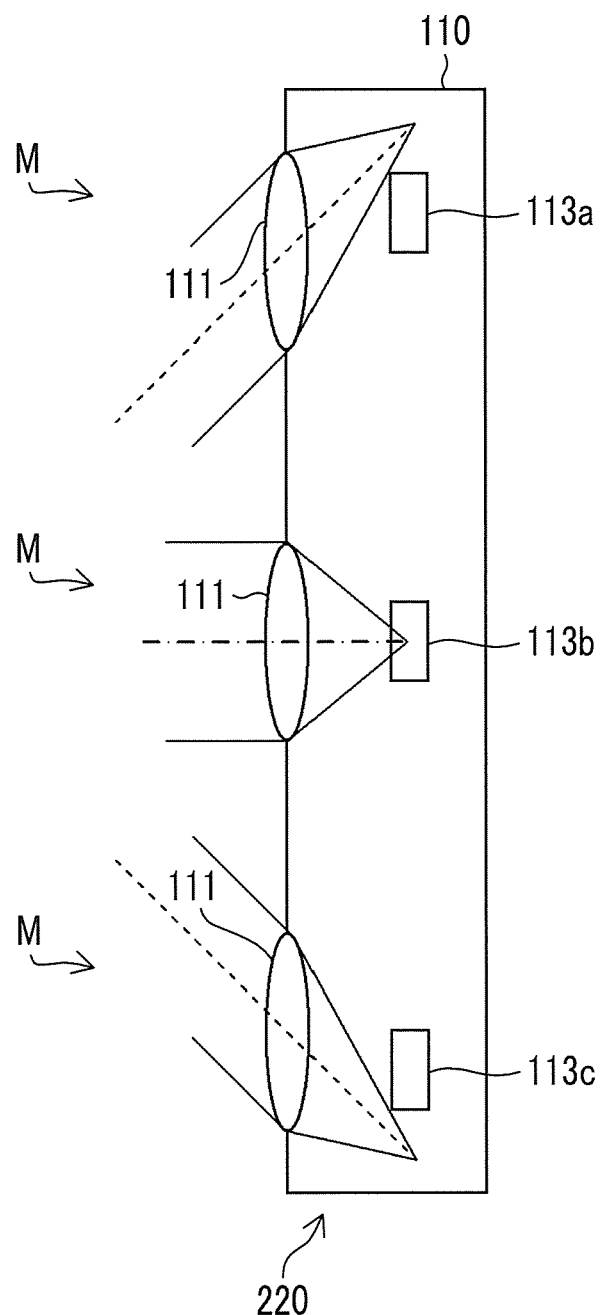
FIG. 14 is a diagram for explaining that a shading characteristic is changed by moving an image sensor.
Figure 15:
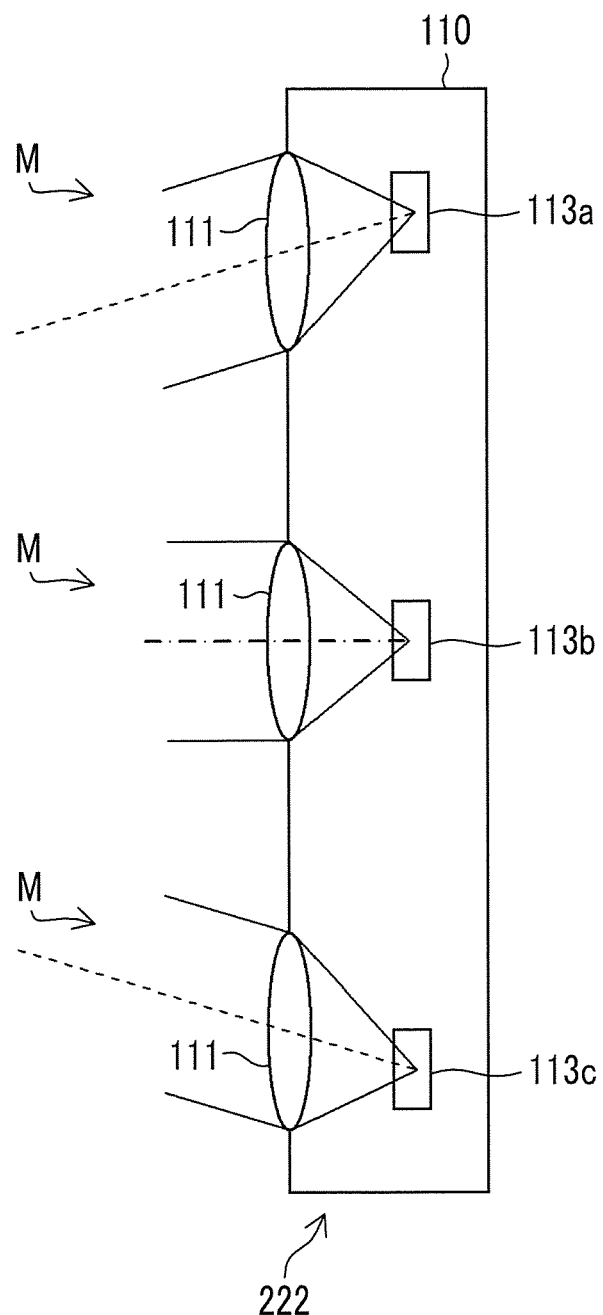
FIG. 15 is a diagram for explaining that a shading characteristic is changed by moving an image sensor.

FIGS. 13, 14, and 15 are a diagram for explaining that a shading characteristic is changed by moving the image sensor 110. Specifically, it is a diagram explaining that an angle of an incident light ray incident on the image sensor 110 is changed by changing the sensor position of the image sensor 110.

FIG. 13 is a diagram schematically showing a positional relationship between the focus lens 12 and the image sensor 110, FIG. 14 is a diagram showing the incidence of a ray M on the pixel at a sensor position 220 in FIG. 13, and FIG. 15 is a diagram showing the incidence of the ray M on the pixel at a sensor position 222 in FIG. 13.

In a case where the image sensor 110 is at the sensor position 220, the angle of the incident light ray is shifted, and the ray M is received at a center pixel 113b, but is not received at pixel ends 113a and 113c (FIG. 14). The angle of the incident light ray of the interchangeable lens 10 and a pixel shift amount are designed assuming a combination between interchangeable lens 10 and the image sensor 110, but on the other hand, in a case where they deviate from the assumed design values, the angle of the incident light ray does not match and the light ray does not reach a diode (pixel) at the pixel end.

In such a case, in a case where the image sensor 110 is moved, the angle of the incident light ray can be changed. As shown in FIG. 13, the image sensor 110 is moved from the sensor position 220 to the sensor position 222. As shown in FIG. 15, in a case where the image sensor 110 moves to the sensor position 222, the angle of the incident light ray of the ray M changes, and the ray M passing through a microlens 111 is also received at the pixel end 113a and the pixel end 113c.

The image evaluation unit 202 acquires the shading characteristic by, for example, comparing a value of the pixel at an edge part of the image with a value of the pixel at the center of the image. Specifically, the image evaluation unit 202 calculates a light amount ratio obtained by dividing "an average of signal values at pixel ends of four corners of the image" by "a signal value of the pixel in the center of the image" as an image evaluation value. It is preferable that the light amount ratio calculated as the image evaluation value is closer to 1. It should be noted that the image evaluation unit 202 may calculate the image evaluation value by comparing signal values of pixels in a predetermined region.

<<Calculation Method of Image Evaluation Value>>

The image evaluation unit 202 calculates the image evaluation value of the image acquired at each sensor position by various calculation methods. The image evaluation unit 202 calculates an image evaluation value at a single position or a plurality of positions in the image. The AF area 114, the AF area 114, and the peripheral position are the positions where the image evaluation value is calculated. The AF area 114 is a position of the subject that the user intends to focus on, that is, a subject position.

The image evaluation unit 202 calculates an image evaluation value on the basis of the contrast, color shift, and shading characteristics at the above-mentioned positions. It should be noted that the image evaluation value may be weighted according to user settings. In addition, for example, the image evaluation value based on shading characteristics may be calculated at the peripheral position, and the image evaluation value based on contrast may be calculated in the AF area.

Figure 16:
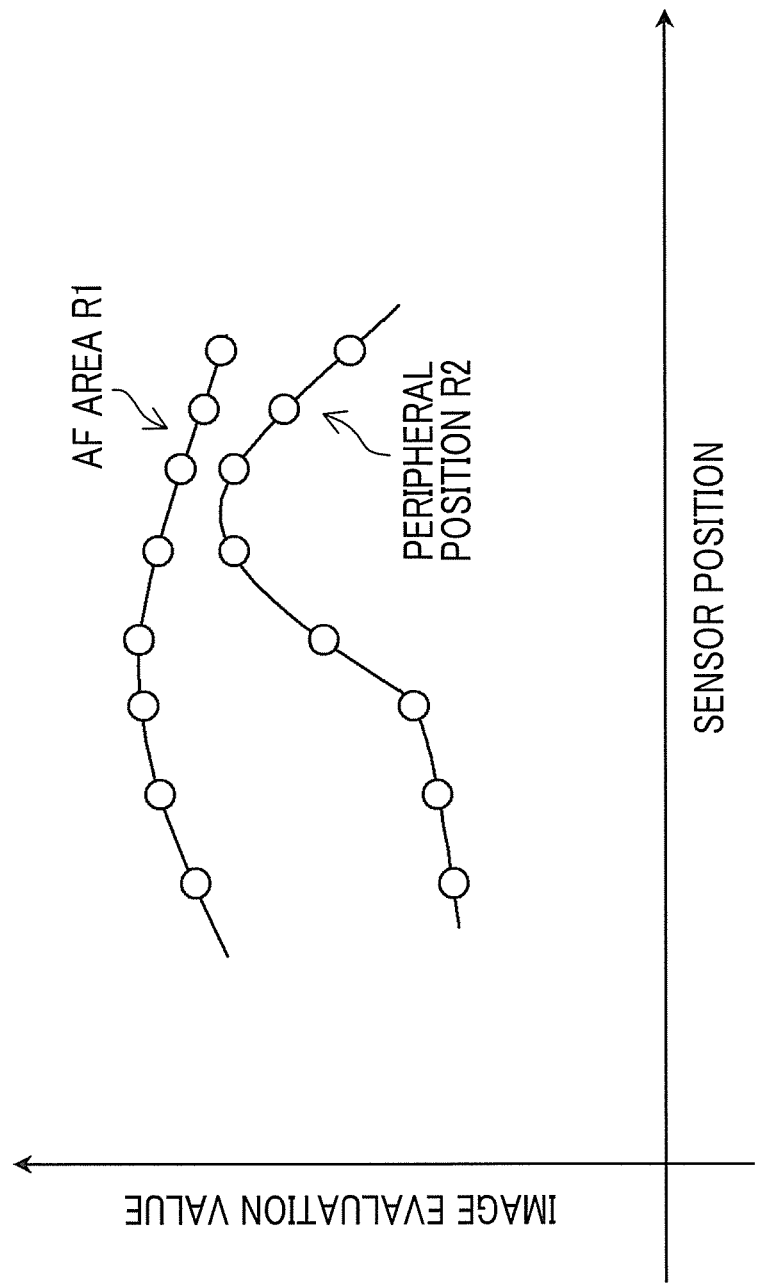
FIG. 16 is a diagram showing an example of a relationship between an image evaluation value of a focused image and a sensor position of an image sensor.

FIG. 16 is a diagram showing an example of a relationship between an image evaluation value of a focused image and a sensor position of the image sensor 110. In FIG. 16, the vertical axis indicates the image evaluation value and the lateral axis indicates the sensor position of the image sensor 110. An AF area (subject position) R1 of the image is a region near the center of the image in which the subject is in focus and is a region including the phase difference detection pixels 118. At a peripheral position R2 of the image, the subject is in focus, but it is the region of the peripheral position of the image. Here, the peripheral position is a region where the user wants to focus, like the subject in the AF area 114. That is, the peripheral position is a region in which the distance from the digital camera 1 is the same as the subject in the AF area 114. For example, in a case where a person's face is in the AF area 114, the peripheral position is a torso part of the person in a vicinity region. In the AF area R1 of the image, since the focal positions of the image sensor 110 and the interchangeable lens 10 are adjusted such that the AF area R1 is in focus, the image evaluation value does not relatively change in the AF area R1. In the AF area R1, the image evaluation value of the AF area (in the AF area determination (step S10), an AF area to be focused is determined among a plurality of AF areas) determined in step S10 of FIG. 7 is calculated as the subject position. It should be noted that the evaluation value is calculated on the basis of the image in the AF area determined in the AF area determination (step S10) in FIG. 16, but the image evaluation value may be calculated by extracting a part of the AF area, or the image evaluation value may be calculated in a range where the plurality of AF areas is expanded.

The image evaluation unit 202 can also calculate a plurality of types of image evaluation values. For example, the image evaluation unit 202 calculates an image evaluation value related to aberration (spherical aberration) and an image evaluation value related to color shift. In this case, the optimum position determination unit 204 may determine an optimum position on the basis of the sum of the image evaluation values, or may perform weighting according to the type of the image evaluation values and sum the image evaluation values. For example, since the color shift can be easily corrected by image processing, the optimum position determination unit 204 reduces the weighting of the image evaluation value related to the color shift, increases the weighting of the image evaluation value related to the spherical aberration, and comprehensively determines the image evaluation value. In addition, the optimum position determination unit 204 may determine which type of image evaluation value is to be prioritized by a command from the user via the operation unit 140.

As described above, in this embodiment, since the image evaluation values at each of the plurality of sensor positions are calculated by analyzing the plurality of acquired images, it is possible to obtain a sensor position at which an image with good image quality can be obtained on the basis of the image evaluation values obtained by directly analyzing the images.

In the above-described embodiment, the hardware structure of the processing unit that executes various processing is the following various processors. The various processors include a central processing unit (CPU) that is a general-purpose processor functioning as various processing units by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute specific processing, and the like.

One processing unit may be configured with one of the various processors or may be configured with two or more processors of the same type or different types (for example, a plurality of FPGAs or a combination of a CPU and an FPGA). In addition, a plurality of processing units may be configured with one processor. As an example of configuring a plurality of processing units with one processor, a first aspect is configuring one processor with a combination of one or more CPUs and software and implementing functions of a plurality of processing units by the processor as represented by a computer such as a client and a server. A second aspect is using a processor that implements the function of the whole system including a plurality of processing units by one integrated circuit (IC) chip as represented by a system on chip (SoC) and the like. Various processing units are configured using one or more of the various processors as a hardware structure.

Furthermore, the hardware structure of the various processors is more specifically an electric circuit (circuitry) in which circuit elements such as semiconductor elements are combined.

Each configuration and each function described above can be appropriately implemented by any hardware, software, or a combination of both hardware and software. For example, the present invention can also be applied to a program that causes a computer to execute the processing steps (processing procedure) described above, a computer-readable recording medium (non-transitory recording medium) on which the program is recorded, or a computer on which the program can be installed.

Second Embodiment

Next, the second embodiment will be described. In the present embodiment, the image for which the image evaluation value is obtained is stored in the memory, and the stored images are composited to generate a composite image.

Figure 17:
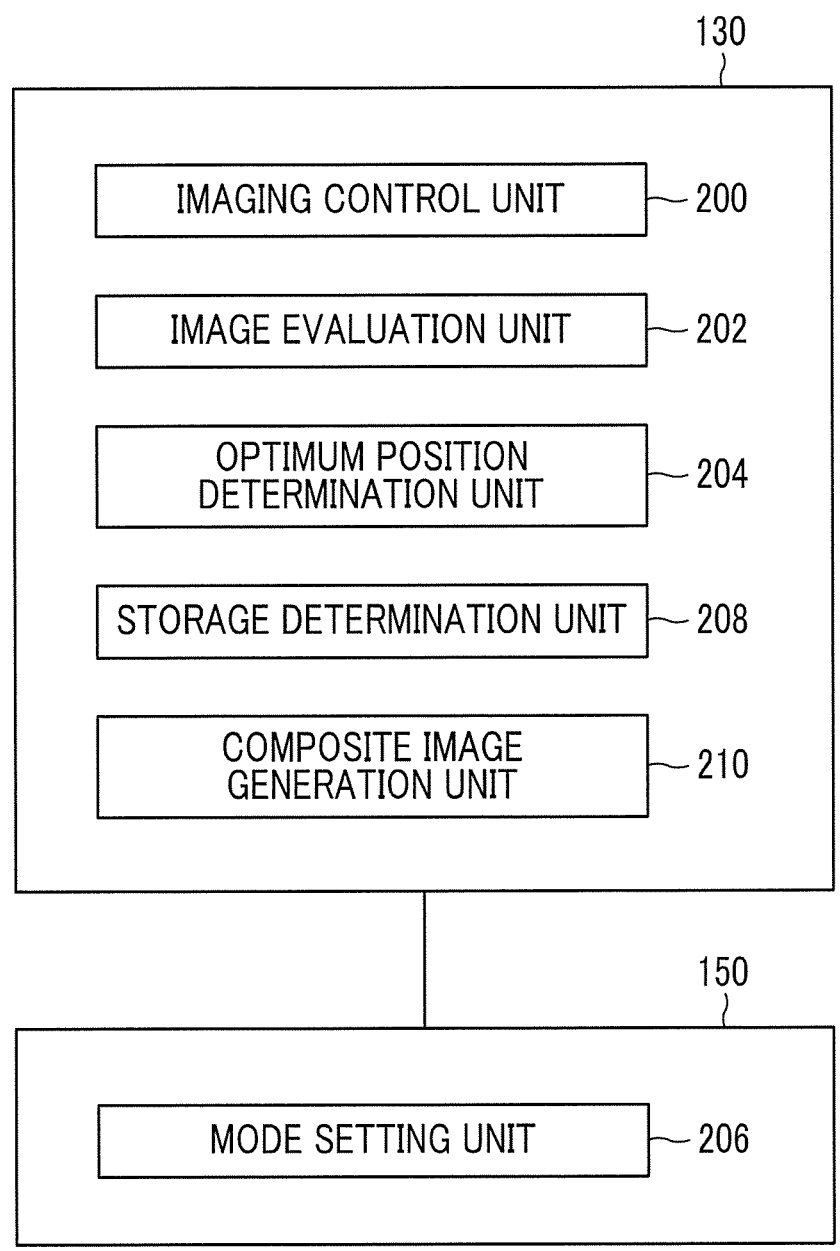
FIG. 17 is a diagram showing a functional configuration example of a camera control unit and a digital signal processing unit.

FIG. 17 is a diagram showing a functional configuration example of the camera control unit 150 and the digital signal processing unit 130 of the present embodiment. The camera control unit 150 has a mode setting unit 206, and the digital signal processing unit 130 is configured with the imaging control unit 200, the image evaluation unit 202, the optimum position determination unit 204, a storage determination unit 208, and a composite image generation unit 210. The positions already described in FIG. 6 are designated by the same reference numerals and the description thereof will be omitted.

The mode setting unit 206 sets an image evaluation mode for operating the AF focusing control unit 150*b*, the imaging control unit 200, and the image evaluation unit 202. Specifically, the mode setting unit 206 sets the image evaluation mode in the digital camera 1 on the basis of a command from the user via the operation unit 140. In the image evaluation mode, unlike the normal imaging, the image sensor 110 outputs an image while moving as described above, and the image evaluation value is calculated from the image. That is, in a case where the image evaluation mode is set, the AF focusing control unit 150*b*, the imaging control unit 200, and the image evaluation unit 202 prepare for an operation or operate. For example, in a case where the imaging lens is mounted on the mount 102, the mode setting unit 206 automatically sets the image evaluation mode according to the type of the mounted imaging lens in a case where the imaging lens can communicate with the camera main body 100.

The storage determination unit 208 determines an image to be stored in the memory on the basis of the image evaluation value acquired at each of the plurality of sensor positions. Specifically, the storage determination unit 208 uses a predetermined threshold value to determine the image to be stored in the memory. For example, the storage determination unit 208 stores a highly evaluated image whose image evaluation value is equal to or more than the threshold value in the memory. Here, as the memory in which the image is stored, for example, the memory card 136 mounted to a memory card I/F is used.

The composite image generation unit 210 composites the images stored in the memory. The image composition performed by the composite image generation unit 210 is performed by a known technique. For example, in a case where the suppression of spherical aberration is prioritized in the region of the center of the image and the shading characteristic is prioritized in the corner of the image, the composite image generation unit 210 acquires an image at an optimum position related to the spherical aberration and an image at an optimum position related to the shading characteristic by bracket capturing (imaging) described later. Then, a desired composite image is obtained by compositing the images acquired by the bracket photographing.

Figure 18:
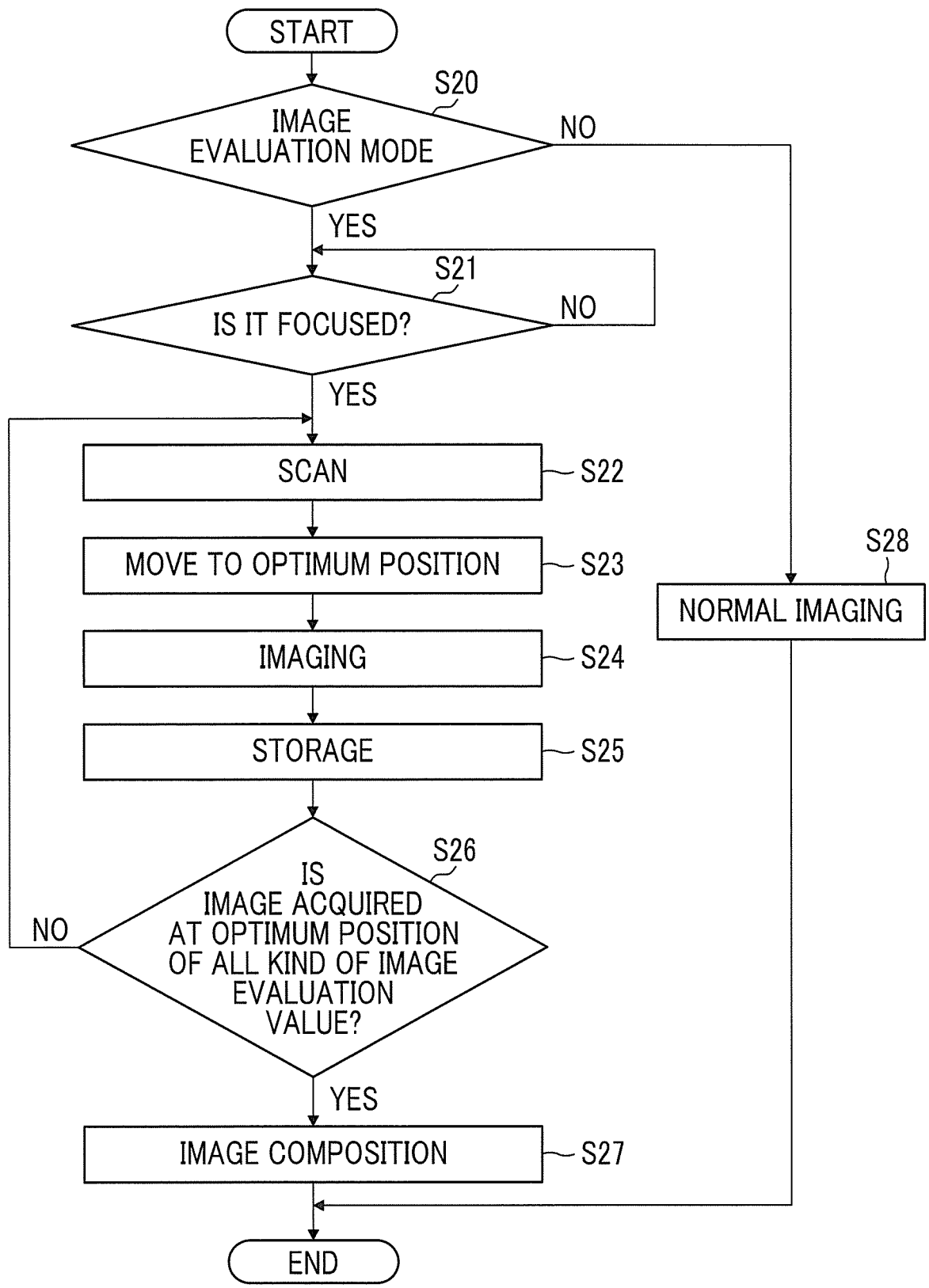
FIG. 18 is a flowchart showing an operation of a digital camera.

Next, an imaging method using the digital camera 1 according to the present embodiment will be described. FIG. 18 is a flowchart showing the operation of the digital camera 1, and shows a case where the bracket capturing is performed at various optimum positions.

First, the mode setting unit 206 determines whether or not the image evaluation mode is set by a command from the user (step S20). In a case where the image evaluation mode is not set, normal imaging is performed (step S28). It should be noted that in a case of performing the bracket photographing, the user inputs the type of image evaluation value. For example, the user inputs such that the bracket capturing is performed at the optimum position related to the aberration and the shading.

In a case where the mode setting unit 206 determines that the image evaluation mode is set, the digital camera 1 transitions to the operation of calculating the image evaluation value.

The autofocus function operates, and the AF focusing control unit 150b operates the focus adjustment unit 22a to focus (step S21). Then, the scan processing is performed (step S22) (for the scan processing, refer to steps S13 to S17 in FIG. 7). The optimum position determination unit 204 determines an optimum position on the basis of image evaluation values obtained at each sensor position after scan processing, and the image sensor movement control unit 150c moves the image sensor 110 to the optimum position (step S23). Imaging is performed after the image sensor 110 moves to the optimum position (step S24), and the storage determination unit 208 stores the obtained image in the memory (step S25). After that, the optimum position determination unit 204 determines whether or not the image has been acquired at the optimum positions of all kinds of set image evaluation values (step S26). In a case where the images are acquired at the optimum positions of all kinds of set image evaluation values, the composite image generation unit 210 performs the image composition (step S27). For example, in the composite image, an image in which the center of the image is captured at the optimum position related to the aberration is used, and an image captured at the optimum position related to the shading is used for the periphery of the image.

<Other>

<<Manual Focus>>

A case of adjusting the focus by using the autofocus function has been described in the above description, but the present invention can also be applied to a case where a manual focus function (manual focus operation) is used to output a focus adjustment instruction instead of the AF focusing control unit 150b.

Figure 19:
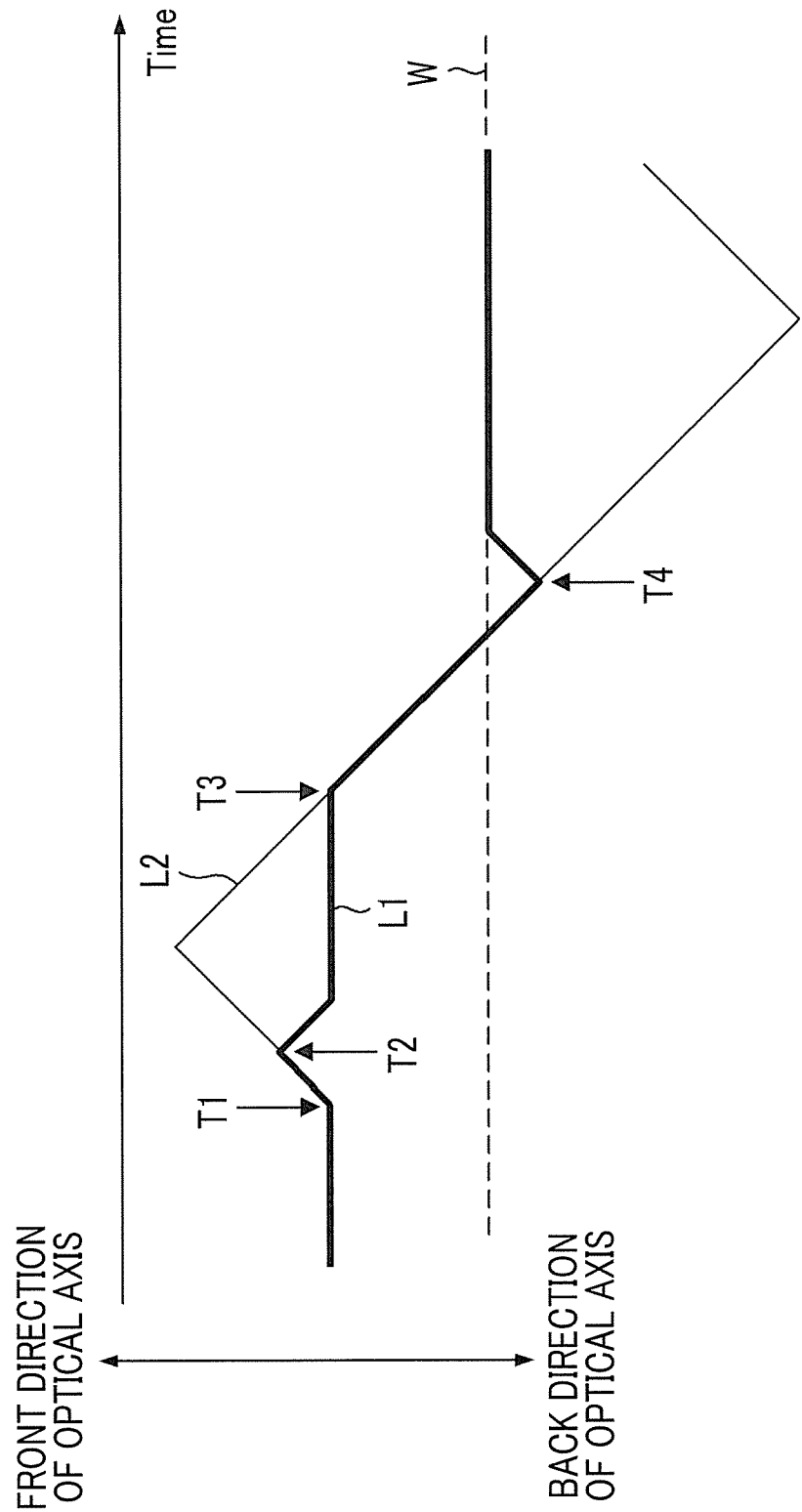
FIG. 19 is a diagram showing movement of an image sensor and a focal position of an interchangeable lens.

In FIG. 19, the focus of the interchangeable lens 10 moves by the manual focus, and the optimum position determination unit 204 sequentially determines the optimum position while the image sensor 110 moves following the focus of the interchangeable lens 10. The positions already described in FIG. 8 are designated by the same reference numerals and the description thereof will be omitted.

The scan processing starts at time T1. Simultaneously with the scan processing, the image evaluation unit 202 calculates the image evaluation value of each image, and the optimum position determination unit 204 sequentially determines the optimum position on the basis of the image evaluation value. Between time T1 and time T2, the image sensor 110 follows to assist and maintain the focus by using the phase difference detection pixel 118. Since the sensor is moved and focused in accordance with the movement of the focus lens 12 by the user using the data of the phase difference detection pixels 118, there is a time lag in following, but it is omitted in FIG. 19. At time T2, the optimum position determination unit 204 determines that the optimum position is not detected in the subsequent movement direction, and moves to the optimum position based on the image evaluation value obtained so far. At L2 between time T2 and time T3, the movement of the focus lens 12 is indicated by L2 in the manual focus operation by the user. In addition, at L1 between time T2 and time T3, an aspect is shown in which the following is stopped since the image evaluation value is getting worse, or the following is stopped within the predetermined sensor movement range.

The scan processing is restarted at time T3, and the scan processing is performed until time T4. During the period from time T3 to time T4, as described above, the image sensor 110 follows the focus lens 12, and the optimum position determination unit 204 sequentially determines an optimum position in the same manner as the scan processing from time T1 to time T2. At time T4, since the image evaluation value is getting worse, the image sensor 110 stops following the focus lens 12 and moves to the optimum position.

<<Other Examples of Lens>>

Although the interchangeable lens 10 has been described as the imaging lens used in the digital camera 1, the present invention is not limited to this, and the present invention is also applied to the digital camera 1 having a non-interchangeable lens.

Figure 20:
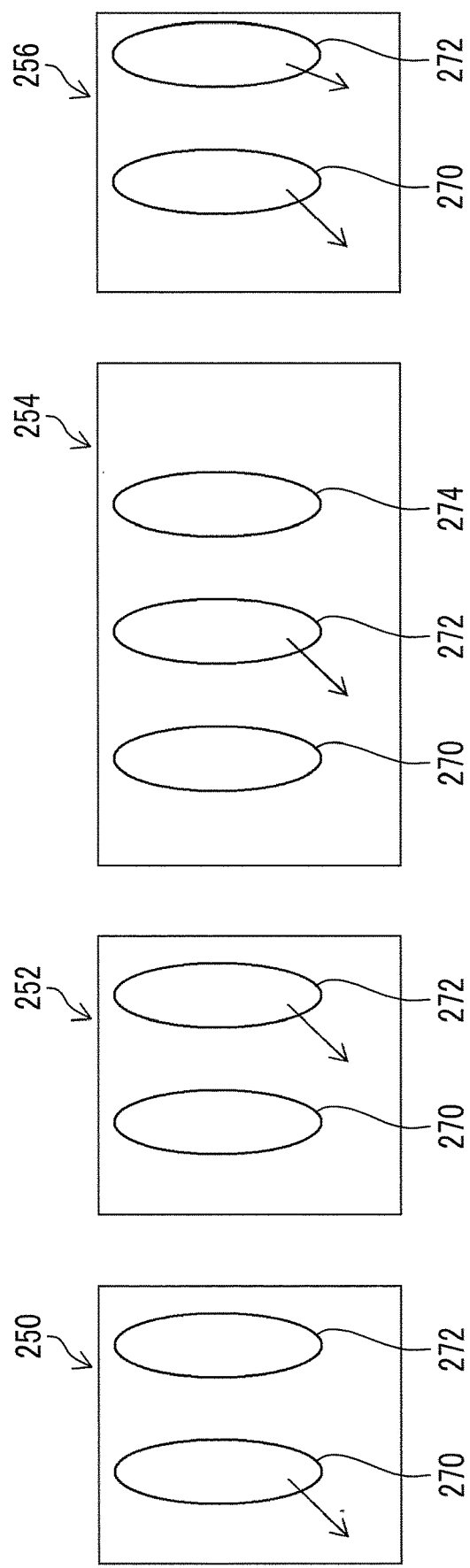
FIG. 20 is a diagram showing an example of an imaging lens.

In addition, various types of movement methods of the focus lens 12 are used. FIG. 20 is a diagram showing an example of an imaging lens that is suitably used in the digital camera 1.

In an imaging lens 250, a first lens group 270 provided on the front is moved and a second lens group 272 provided on the back is fixed. The focal position of the imaging lens 250 is moved by moving the first lens group 270.

In an imaging lens 252, the first lens group 270 provided in the front is fixed, and the second lens group 272 provided in the back is moved. The focal position of the imaging lens 250 is moved by moving the second lens group 272.

In an imaging lens 254, the first lens group 270 provided in the front is fixed, the second lens group 272 provided in the middle is moved, and a third lens group 274 provided in the back is fixed. The focal position of the imaging lens 254 is moved by moving the second lens group 272.

In an imaging lens 256, the first lens group 270 provided in the front is moved, and the second lens group 272 provided in the back is moved. The movement speeds of the first lens group 270 and the second lens group 272 are different, and the focal position of the imaging lens 256 is changed by moving the first lens group 270 and the second lens group 272.

While the examples of the present invention are described thus far, the present invention is not limited to the embodiments and can be subjected to various deformations without departing from the spirit of the present invention.

EXPLANATION OF REFERENCES

1: digital camera
4: image
10: interchangeable lens
12: focus lens
14: stop
16: focus lens driving unit
18: focus lens position detection unit
20: stop driving unit
22: lens control unit
22a: focus adjustment unit
100: camera main body
102: mount
110: image sensor
112: imaging surface
113a: pixel end
113c: pixel end
114: AF area
116: normal pixel
118: phase difference detection pixel
118A: first phase difference detection pixel
118B: second phase difference detection pixel
120: image sensor movement driving unit
122: image sensor position detection unit
124: image sensor driving unit
126: analog signal processing unit
128: ADC 130: digital signal processing unit
132: phase difference AF processing unit
134: memory card interface
136: memory card
138: display unit
140: operation unit
150: camera control unit
150b: AF focusing control unit
150c: image sensor movement control unit
200: imaging control unit
202: image evaluation unit
204: optimum position determination unit
206: mode setting unit
208: storage determination unit
210: composite image generation unit

What is claimed is:

1. An imaging apparatus comprising:
an image sensor configured to capture an optical image passing through an imaging lens and outputs original image data; and
at least one processor configured to:
cause a focus lens of the imaging lens and the image sensor to move so as to focus a subject at each of a plurality of sensor positions in an optical axis direction of the imaging lens;
acquire image data of the subject focused at each of the plurality of sensor positions by causing the focusing lens to move on the basis of the original image data output from the image sensor; and
analyze the image data of the subject focused at each of the plurality of sensor positions and calculate an image evaluation value at each of the plurality of sensor positions.

2. The imaging apparatus according to claim 1,
wherein the at least one processor determines an optimum position of the image sensor on the basis of the image evaluation value acquired at each of the plurality of sensor positions, and
causes the image sensor to move to the optimum position.

3. The imaging apparatus according to claim 1, further comprising
a memory that stores the image data,
wherein the at least one processor determines the image data to be stored in the memory on the basis of the image evaluation value acquired at each of the plurality of sensor positions.

4. The imaging apparatus according to claim 1,
wherein the at least one processor performs the focus adjustment by an inner focus method or a rear focus method.

5. The imaging apparatus according to claim 1, further comprising:
a at least one processor that sets an image evaluation mode for operating the image sensor, the focus lens, and image evaluation value calculation.

6. The imaging apparatus according to claim 5, further comprising:
a mount on which the imaging lens is mounted,
wherein the at least one processor automatically sets the image evaluation mode according to a type of the imaging lens mounted on the mount.

7. The imaging apparatus according to claim 1,
wherein the at least one processor calculates the image evaluation value by performing an analysis on at least two positions of a subject position, which is a position of the subject, and a peripheral position in the image data.

8. The imaging apparatus according to claim 7,
wherein the peripheral position is determined on the basis of distance information of the subject.

9. The imaging apparatus according to claim 1,
wherein the at least one processor calculates the image evaluation value on the basis of a contrast of the image data.

10. The imaging apparatus according to claim 1,
wherein the at least one processor calculates the image evaluation value on the basis of a spatial frequency characteristic acquired from the image data.

11. The imaging apparatus according to claim 1,
wherein the at least one processor calculates the image evaluation value on the basis of a color shift amount acquired from the image data.

12. The imaging apparatus according to claim 1,
wherein the at least one processor calculates the image evaluation value on the basis of a shading characteristic acquired from the image data.

13. An imaging apparatus comprising:
an image sensor configured to capture an optical image passing through an imaging lens and outputs original image data; and
at least one processor configured to:
cause a focus lens of the imaging lens and the image sensor to move so as to focus a subject at each of a plurality of sensor positions in an optical axis direction of the imaging lens in a case of receiving a focus adjustment instruction by a manual focus operation;
acquire image data of the subject focused at each of the plurality of sensor positions on the basis of the original image data output from the image sensor;
analyze the image data of the subject focused at each of the plurality of sensor positions and calculate an image evaluation value at each of the plurality of sensor positions; and
determine an optimum position of the image sensor on the basis of the image evaluation value acquired at each of the plurality of sensor positions,
wherein the at least one processor causes the image sensor to move to the optimum position.

14. An imaging apparatus comprising:
a memory configured to store image data;
an image sensor configured to capture an optical image passing through an imaging lens and outputs original image data;
at least one processor configured to:
cause a focus lens of the imaging lens and the image sensor to move so as to focus a subject at each of a plurality of sensor positions in an optical axis direction of the imaging lens
in a case of receiving a focus adjustment instruction by a manual focus operation;
acquire image data of the subject focused at each of the plurality of sensor positions on the basis of the original image data output from the image sensor;
analyze the image data of the subject focused at each of the plurality of sensor positions and calculate an image evaluation value at each of the plurality of sensor positions; and
determine the image data to be stored in the memory on the basis of the image evaluation value acquired at each of the plurality of sensor positions.

15. The imaging apparatus according to claim 14,
wherein the at least one processor determines an optimum position of the image sensor on the basis of the image evaluation value acquired at each of the plurality of sensor positions, and causes the image sensor to move to the optimum position.

16. The imaging apparatus according to claim 13,
a memory configured to store the image data,
wherein the at least one processor determines the image data to be stored in the memory on the basis of the image evaluation value acquired at each of the plurality of sensor positions.

17. The imaging apparatus according to claim 13,
wherein the at least one processor performs the focus adjustment by an inner focus method or a rear focus method.

18. An imaging method comprising:
a focus adjustment step of moving a focus lens of an imaging lens to perform a focus adjustment;
an image sensor movement control step of moving an image sensor that captures an optical image passing through the imaging lens and outputs original image data to a plurality of sensor positions in an optical axis direction of the imaging lens;
a focusing control step of focusing a subject at each of the plurality of sensor positions by activating the focus adjustment step and the image sensor movement control step;
an imaging control step of acquiring image data of the subject focused at each of the plurality of sensor positions by the focusing control step on the basis of the original image data output from the image sensor; and
an image evaluation step of analyzing the image data of the subject focused at each of the plurality of sensor positions acquired by the imaging control step and calculates an image evaluation value at each of the plurality of sensor positions.

19. An imaging method comprising:
a focus adjustment step of moving a focus lens of an imaging lens to perform a focus adjustment;
an image sensor movement control step of moving an image sensor that captures an optical image passing through the imaging lens and outputs original image data to a plurality of sensor positions in an optical axis direction of the imaging lens;
a focusing control step of activating the image sensor movement control step to focus a subject at each of the plurality of sensor positions in a case where the focus adjustment step receives a focus adjustment instruction by a manual focus operation;
an imaging control step of acquiring image data of the subject focused at each of the plurality of sensor positions by the focusing control step on the basis of the original image data output from the image sensor;
an image evaluation step of analyzing the image data of the subject focused at each of the plurality of sensor positions acquired by the imaging control step and calculates an image evaluation value at each of the plurality of sensor positions; and
an optimum position determination step of determining an optimum position of the image sensor on the basis of the image evaluation value acquired at each of the plurality of sensor positions,
wherein the image sensor movement control step moves the image sensor to the optimum position.

20. A non-transitory computer-readable recording medium for causing a computer to realize an imaging process in a case where a command stored in the recording medium is read by the computer, the imaging process comprising:
a focus adjustment step of moving a focus lens of an imaging lens to perform a focus adjustment;
an image sensor movement control step of moving an image sensor that captures an optical image passing through the imaging lens and outputs original image data to a plurality of sensor positions in an optical axis direction of the imaging lens;
a focusing control step of focusing a subject at each of the plurality of sensor positions by activating the focus adjustment step and the image sensor movement control step;
an imaging control step of acquiring image data of the subject focused at each of the plurality of sensor positions by the focusing control step on the basis of the original image data output from the image sensor; and
an image evaluation step of analyzing the image data of the subject focused at each of the plurality of sensor positions acquired by the imaging control step and calculates an image evaluation value at each of the plurality of sensor positions.

21. A non-transitory computer-readable recording medium for causing a computer to realize an imaging process in a case where a command stored in the recording medium is read by the computer, the imaging process comprising:
a focus adjustment step of moving a focus lens of an imaging lens to perform a focus adjustment;
an image sensor movement control step of moving an image sensor that captures an optical image passing through the imaging lens and outputs original image data to a plurality of sensor positions in an optical axis direction of the imaging lens;
a focusing control step of activating the image sensor movement control step to focus a subject at each of the plurality of sensor positions in a case where the focus adjustment step receives a focus adjustment instruction by a manual focus operation;
an imaging control step of acquiring image data of the subject focused at each of the plurality of sensor positions by the focusing control step on the basis of the original image data output from the image sensor;
an image evaluation step of analyzing the image data of the subject focused at each of the plurality of sensor positions acquired by the imaging control step and calculates an image evaluation value at each of the plurality of sensor positions; and
an optimum position determination step of determining an optimum position of the image sensor on the basis of the image evaluation value acquired at each of the plurality of sensor positions,
wherein the image sensor movement control step moves the image sensor to the optimum position.

22. An imaging method comprising:
a focus adjustment step of moving a focus lens of an imaging lens to perform a focus adjustment;
an image sensor movement control step of moving an image sensor that captures an optical image passing through the imaging lens and outputs original image data to a plurality of sensor positions in an optical axis direction of the imaging lens;
a focusing control step of activating the image sensor movement control step to focus a subject at each of the plurality of sensor positions in a case where the focus adjustment step receives a focus adjustment instruction by a manual focus operation;

an imaging control step of acquiring image data of the subject focused at each of the plurality of sensor positions by the focusing control step on the basis of the original image data output from the image sensor;

an image evaluation step of analyzing the image data of the subject focused at each of the plurality of sensor positions acquired by the imaging control step and calculates an image evaluation value at each of the plurality of sensor positions; and a storage determination step of determining the image data to be stored in a memory on the basis of the image evaluation value acquired at each of the plurality of sensor positions.

23. A non-transitory computer-readable recording medium for causing a computer to realize an imaging process in a case where a command stored in the recording medium is read by the computer, the imaging process comprising:

a focus adjustment step of moving a focus lens of an imaging lens to perform a focus adjustment;

an image sensor movement control step of moving an image sensor that captures an optical image passing through the imaging lens and outputs original image data to a plurality of sensor positions in an optical axis direction of the imaging lens;

a focusing control step of activating the image sensor movement control step to focus a subject at each of the plurality of sensor positions in a case where the focus adjustment step receives a focus adjustment instruction by a manual focus operation;

an imaging control step of acquiring image data of the subject focused at each of the plurality of sensor positions by the focusing control step on the basis of the original image data output from the image sensor;

an image evaluation step of analyzing the image data of the subject focused at each of the plurality of sensor positions acquired by the imaging control step and calculates an image evaluation value at each of the plurality of sensor positions; and a storage determination step of determining the image data to be stored in a memory on the basis of the image evaluation value acquired at each of the plurality of sensor positions.

* * * * *